US010547871B2

(12) United States Patent
Aydin et al.

(10) Patent No.: US 10,547,871 B2
(45) Date of Patent: Jan. 28, 2020

(54) EDGE-AWARE SPATIO-TEMPORAL FILTERING AND OPTICAL FLOW ESTIMATION IN REAL TIME

(71) Applicant: Disney Enterprises, Inc., Burbank, CA (US)

(72) Inventors: Tunc Ozan Aydin, Zurich (CH); Florian Michael Scheidegger, Unterramsern (CH); Michael Stefano Fritz Schaffner, Zurich (CH); Lukas Cavigelli, Zurich (CH); Luca Benini, Zurich (CH); Aljosa Aleksej Andrej Smolic, Dublin (IE)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 193 days.

(21) Appl. No.: 15/588,463

(22) Filed: May 5, 2017

(65) Prior Publication Data
US 2018/0324465 A1 Nov. 8, 2018

(51) Int. Cl.
*H04N 19/615* (2014.01)
*H04N 19/51* (2014.01)
(Continued)

(52) U.S. Cl.
CPC .......... *H04N 19/615* (2014.11); *G06T 5/001* (2013.01); *G06T 5/20* (2013.01); *H04N 19/51* (2014.11);
(Continued)

(58) Field of Classification Search
USPC ........ 348/43, 54, 701; 375/240.08; 382/103, 382/162
See application file for complete search history.

(56) References Cited

U.S. PATENT DOCUMENTS 9,153,027 B2 * 10/2015 Gallo .................... G06T 3/0068
9,530,042 B1 * 12/2016 Saeed .................. G06K 9/0008
(Continued)

OTHER PUBLICATIONS

Fu, H., et al., "BHoG: binary descriptor for sketch-based image retrieval", Multimedia Systems (2016) 22:127-136, also published on line Aug. 9, 2014.*
(Continued)

*Primary Examiner* — Xuemei G Chen
(74) *Attorney, Agent, or Firm* — Patterson + Sheridan, LLP

(57) ABSTRACT

The disclosure provides an approach for edge-aware spatio-temporal filtering. In one embodiment, a filtering application receives as input a guiding video sequence and video sequence(s) from additional channel(s). The filtering application estimates a sparse optical flow from the guiding video sequence using a novel binary feature descriptor integrated into the Coarse-to-fine PatchMatch method to compute a quasi-dense nearest neighbor field. The filtering application then performs spatial edge-aware filtering of the sparse optical flow (to obtain a dense flow) and the additional channel(s), using an efficient evaluation of the permeability filter with only two scan-line passes per iteration. Further, the filtering application performs temporal filtering of the optical flow using an infinite impulse response filter that only requires one filter state updated based on new guiding video sequence video frames. The resulting optical flow may then be used in temporal edge-aware filtering of the additional channel(s) using the nonlinear infinite impulse response filter.

20 Claims, 10 Drawing Sheets
(2 of 10 Drawing Sheet(s) Filed in Color)

(51) Int. Cl.
H04N 19/80 (2014.01)
G06T 5/00 (2006.01)
G06T 5/20 (2006.01)

(52) U.S. Cl.
CPC .... H04N 19/80 (2014.11); *G06T 2207/20016* (2013.01); *G06T 2207/20182* (2013.01)

(56) References Cited

U.S. PATENT DOCUMENTS

| | | | | |
|---|---|---|---|---|
| 9,736,366 | B1* | 8/2017 | Barron | H04N 5/23232 |
| 2006/0285724 | A1* | 12/2006 | Tian | G06K 9/00335 |
| | | | | 382/103 |
| 2011/0109720 | A1* | 5/2011 | Smolic | H04N 13/0011 |
| | | | | 348/43 |
| 2014/0146235 | A1* | 5/2014 | Smolic | H04N 5/145 |
| | | | | 348/701 |
| 2015/0348273 | A1* | 12/2015 | Chapiro | G06K 9/52 |
| | | | | 348/54 |
| 2015/0365696 | A1* | 12/2015 | Garud | H04N 19/53 |
| | | | | 375/240.08 |
| 2016/0027160 | A1* | 1/2016 | Aydin | G06T 5/40 |
| | | | | 382/162 |
| 2016/0027161 | A1* | 1/2016 | Aydin | G06T 5/009 |
| | | | | 382/162 |
| 2017/0148143 | A1* | 5/2017 | Snider | G06T 7/20 |
| 2018/0053293 | A1* | 2/2018 | Ramalingam | G06K 9/46 |
| 2018/0157931 | A1* | 6/2018 | D'Ercoli | G06K 9/6211 |
| 2018/0181816 | A1* | 6/2018 | Garud | G06K 9/00791 |

OTHER PUBLICATIONS

T. O. Aydn, N. Stefanoski, S. Croci, et al., "Temporally Coherent Local Tone Mapping of HDR Video," ACM TOG, vol. 33, No. 6, 2014.
E. S. L. Gastal and M. M. Oliveira, "Domain transform for edge-aware image and video processing," ACM TOG, vol. 30, No. 4, 2011.
F. Durand and J. Dorsey, "Fast Bilateral Filtering for the Display of High-dynamic-range Images," ACM TOG, pp. 257-266, Jul. 2002.
A. Criminisi, T. Sharp, C. Rother, and P. P'erez, "Geodesic Image and Video Editing," ACM TOG, vol. 29, No. 5, p. 134, 2010.
C. Rhemann, A. Hosni, M. Bleyer, C. Rother, and M. Gelautz, "Fast Cost-Volume Filtering for Visual Correspondence and Beyond," in IEEE CVPR, 2011, pp. 3017-3024.
M. Lang, O. Wang, T. Aydin, A. Smolic, and M. Gross, "Practical Temporal Consistency for Image-Based Graphics Applications," ACM TOG, vol. 31, No. 4, p. 34, 2012.
G. Ye, E. Garces, Y. Liu, Q. Dai, and D. Gutierrez, "Intrinsic Video and Applications," ACM TOG, vol. 33, No. 4, pp. 80:1-80:11, Jul. 2014. [Abstract Only].
N. Bonneel, J. Tompkin, K. Sunkavalli, D. Sun, S. Paris, and H. Pfister, "Blind Video Temporal Consistency," ACM TOG, vol. 34, No. 6, 2015.
D. Lowe, "Distinctive Image Features From Scale-Invariant Keypoints," IJCV, vol. 60, No. 2, pp. 91-110, 2004.
H. Bay, T. Tuytelaars, and L. Van Gool, "SURF: Speeded up Robust Features," ECCV, pp. 404-417, 2006.
M. Calonder, V. Lepetit, M. Ozuysal, et al., "BRIEF: Computing a Local Binary Descriptor Very Fast," in IEEE TPAMI, vol. 34, No. 7, 2012.
A. Alahi, R. Ortiz, and P. Vandergheynst, "FREAK: Fast Retina Keypoint," in IEEE CVPR, 2012, pp. 510-517.
F. Zilly, C. Riechert, P. Eisert, and P. Kauff, "Semantic Kernels Binarized—A Feature Descriptor for Fast and Robust Matching," in CVMP, 2011.
M. Schaffner, P. A. Hager, L Cavigelli, et al., "A Complete Real-Time Feature Extraction and Matching System Based on Semantic Kernels Binarized," in VLSI-SoC: At the Crossroads of Emerging Trends. Springer Berlin Heidelberg, 2015.

Y. Hu, R. Song, and Y. Li, "Efficient Coarse-to-Fine PatchMatch for Large Displacement Optical Flow," in IEEE CVPR, 2016.
C. Barnes, E. Shechtman, A. Finkelstein, and D. Goldman, "PatchMatch: a Randomized Correspondence Algorithm for Structural Image Editing," ACM TOG, vol. 28, No. 3, p. 24, 2009.
D. J. Butler, J. Wulff, G. B. Stanley, and M. J. Black, "A naturalistic open source movie for optical flow evaluation," in ECCV, 2012.
P. Milanfar, "A tour of modern image filtering: New insights and methods, both practical and theoretical," IEEE SPM, Jan. 2013.
C. Tomasi and R. Manduchi, "Bilateral filtering for gray and color images," in ICCV, Jan. 1998, pp. 839-846.
Z. Farbman, R. Fattal, D. Lischinski, and R. Szeliski, "Edge-preserving decompositions for multi-scale tone and detail manipulation," ACM TOG, vol. 27, No. 3, pp. 67:1-67:10, Aug. 2008.
R. Fattal, "Edge-avoiding wavelets and their applications," ACM TOG, vol. 28, No. 3, pp. 1-10, 2009.
K. He, J. Sun, and X. Tang, "Guided image filtering," IEEE TPAMI, vol. 35, No. 6, pp. 1397-1409, Jun. 2013.
E. S. Gastal and M. M. Oliveira, "High-Order Recursive Filtering of Non-Uniformly Sampled Signals for Image and Video Processing," in Computer Graphics Forum, vol. 34, No. 2, 2015, pp. 81-93.
M. Aubry, S. Paris, S. W. Hasinoff, et al., "Fast Local Laplacian Filters: Theory and Applications," ACM TOG, vol. 33, No. 5, p. 167, 2014.
S. Paris, S. W. Hasinoff, and J. Kautz, "Local Laplacian Filters: Edge-Aware Image Processing With a Laplacian Pyramid," ACM TOG, vol. 30, No. 4, p. 68, 2011.
P. Perona and J. Malik, "Scale-space and edge detection using anisotropic diffusion," IEEE TPAMI, vol. 12, No. 7, Jul. 1990.
D. Sun, S. Roth, and M. J. Black, "Secrets of Optical Flow Estimation and their Principles," in IEEE CVPR, Jun. 2010, pp. 2432-2439.
H. Zimmer, A. Bruhn, and J. Weickert, "Optic Flow in Harmony," IJCV, vol. 93, No. 3, pp. 368-388, 2011.
R. Timofte and L. Van Gool, "Sparse Flow: Sparse Matching for Small to Large Displacement Optical Flow," in IEEE WACV, 2015.
J. Revaud, P. Weinzaepfel, Z. Harchaoui, and C. Schmid, "EpicFlow: Edge-preserving Interpolation of Correspondences for Optical Flow," in IEEE CVPR, 2015, pp. 1164-1172.
P. Weinzaepfel, J. Revaud, Z. Harchaoui, and C. Schmid, "Deepflow: Large Displacement Optical Flow with Deep Matching," in IEEE ICCV, 2013, pp. 1385-1392.
J. Wulff and M. J. Black, "Efficient Sparse-to-Dense Optical Flow Estimation Using a Learned Basis and Layers," in IEEE CVPR, 2015.
C. Liu, J. Yuen, and A. Torralba, "SIFT Flow: Dense Correspondence across Scenes and its Applications," IEEE TPAMI, 2010.
S. Leutenegger, M. Chli, and R. Siegwart, "BRISK: Binary Robust Invariant Scalable Keypoints," in IEEE ICCV, 2011, pp. 2548-2555.
M. Brown, G. Hua, and S. Winder, "Discriminative Learning of Local Image Descriptors," IEEE TPAMI, vol. 33, No. 1, pp. 43-57, Jan. 2011.
C. Strecha, A. Bronstein, M. Bronstein, and P. Fua, "Ldahash: Improved matching with smaller descriptors," IEEE TPAMI, vol. 34, No. 1, 2012. [Abstract Only].
L. Baroffio, M. Cesana, A. Redondi, and M. Tagliasacchi, "Bamboo: A Fast Descriptor Based on AsymMetric Pairwise BOOsting," in IEEE ICIP, 2014, pp. 5686-5690.
X. Yang and K. T. Cheng, "Learning Optimized Local Difference Binaries for Scalable Augmented Reality on Mobile Devices," IEEE TVCG, vol. 20, No. 6, pp. 852-865, Jun. 2014.
T. Trzcinski, M. Christoudias, and V. Lepetit, "Learning Image Descriptors with Boosting," IEEE TPAMI, vol. 37, No. 3, pp. 597-610, 2015.
M. Zwicker, H. Pfister, J. V. Baar, and M. Gross, "EWA Splatting," IEEE TVCG, vol. 8, No. 3, pp. 223-238, 2002.
M. Lang, A. Hornung, O. Wang, et al., "Nonlinear Disparity Mapping for Stereoscopic 3D," ACM TOG, vol. 29, No. 4, p. 75, 2010.
P. Greisen, M. Schaffner, S. Heinzle, et al., "Analysis and VLSI Implementation of EWA Rendering for Real-Time HD Video Applications," IEEE TCSVT, vol. 22, No. 11, pp. 1577-1589, Nov. 2012.

(56) References Cited

OTHER PUBLICATIONS

N. Dalal and B. Triggs, "Histograms of Oriented Gradients for Human Detection," in IEEE CVPR, vol. 1, 2005, pp. 886-893.

H. Kaeslin, "Top-Down Digital VLSI Design, from VLSI Architectures to Gate-Level Circuits and FPGAs," Morgan Kaufmann, 2014.

K. Zuiderveld, "Graphics gems iv," P. S. Heckbert, Ed. San Diego, CA, USA: Academic Press Professional, Inc., 1994, ch. Contrast Limited Adaptive Histogram Equalization, pp. 474-485.

M. Calonder, V. Lepetit, C. Strecha, and P. Fua, "BRIEF: Binary Robust Independent Elementary Features," in ECCV, ser. Lecture Notes in Computer Science, 2010, vol. 6314, pp. 778-792.

P. Yu, X. Yang, and L. Chen, "Parallel-friendly Patch Match Based on Jump Flooding," in Advances on Digital Television and Wireless Multimedia Communications. Springer, 2012, pp. 15-21.

K. He and J. Sun, "Computing Nearest-Neighbor Fields via Propagation-Assisted kd-Trees," in IEEE CVPR. IEEE, 2012, pp. 111-118.

R. Kennedy and C. J. Taylor, "Optical Flow with Geometric Occlusion Estimation and Fusion of Multiple Frames," in EMMCVPR, 2015.

M. Menze, C. Heipke, and A. Geiger, "Discrete Optimization for Optical Flow," in GCPR. Springer, 2015, pp. 16-28.

C. Bailer, B. Taetz, and D. Stricker, "Flow Fields: Dense Correspondence Fields for Highly Accurate Large Displacement Optical Flow Estimation," in IEEE ICCV, 2015, pp. 4015-4023.

A. Skende, "Introducing 'Parker' Next-Generation Tegra System-on-Chip," August, Hot Chips 2016.

R. Hartley and A. Zisserman, "Multiple view geometry," Cambridge University Press, Cambridge, UK, 2000.

L. Itti, C. Koch, and E. Niebur, "A Model of Saliency-based Visual Attention for Rapid Scene Analysis," IEEE TPAMI, vol. 20, 1998.

N. Stefanoski, O. Wang, M. Lang, P. Greisen, S. Heinzle, and A. Smolic, "Automatic View Synthesis by Image-Domain-Warping," IEEE TIP, vol. 22, No. 9, pp. 3329-3341, 2013.

C. Guo, Q. Ma, and L. Zhang, "Spatio-Temporal Saliency Detection Using Phase Spectrum of Quaternion Fourier Transform," in IEEE CVPR, Jun. 2008, pp. 1-8.

P. Greisen, M. Lang, S. Heinzle, and A. Smolic, "Algorithm and VLSI Architecture for Real-time 1080P60 Video Retargeting," in ACM EGGHHPG, 2012, pp. 57-66.

M. Schaffner, F. Gurkaynak, P. Greisen, H. Kaeslin, L. Benini, and A. Smolic, "Hybrid ASIC/FPGA System for Fully Automatic Stereoto—Multiview Conversion using IDW," IEEE TCSVT, vol. PP, 2015.

B. K. Horn and B. G. Schunck, "Determining optical flow," in 1981 Technical symposium east. International Society for Optics and Photonics, 1981, pp. 319-331.

B. D. Lucas, T. Kanade et al., "An iterative image registration technique with an application to stereo vision." in IJCAI, vol. 81, 1981, pp. 674-679.

A. Alahi, R. Ortiz, and P. Vandergheynst, "Freak: Fast retina keypoint," in Computer Vision and Pattern Recognition (CVPR), 2012 IEEE Conference on, Jun. 2012, pp. 510-517.

D. G. Lowe, "Distinctive image features from scale-invariant keypoints," International Journal of Computer Vision, vol. 60, No. 2, pp. 91-110. [Online]. Available: http://dx.doi.org/10.1023/B:VISI.0000029664.99615.94.

M. Schaffner, P. Hager, L. Cavigelli, Z. Fang, P. Greisen, F. Grkaynak, A. Smolic, H. Kaeslin, and L. Benini, "A complete real-time feature extraction and matching system based on semantic kernels binarized," in VLSI-SoC: At the Crossroads of Emerging Trends, ser. IFIP Advances in Information and Communication Technology, A. Orailoglu, H. F. Ugurdag, L. M. Silveira, M. Margala, and R. Reis,Eds. Springer International Publishing, 2015, vol. 461, pp. 144-167. [Online]. Available: http://dx.doi.org/10.1007/978-3-319-23799-2_7.

M. Lang, O. Wang, T. Aydin, A. Smolic, and M. Gross, "Practical temporal consistency for image-based graphics applications," ACM Trans. Graph., vol. 31, No. 4, pp. 34:1-34:8, Jul. 2012. [Online]. Available: http://doi.acm.org/http://doi.acm.org/10.1145/2185520.2185530.

K. Chaudhury, D. Sage, and M. Unser, "Fast o(1) bilateral filtering using trigonometric range kernels," Image Processing, IEEE Transactions on, vol. 20, No. 12, pp. 3376-3382, Dec. 2011.

E. S. L. Gastal and M. M. Oliveira, "High-order recursive filtering of non-uniformly sampled signals for image and video processing," Computer Graphics Forum, vol. 34, No. 2, pp. 81-93, May 2015, proceedings of Eurographics 2015.

K. He and J. Sun, "Fast guided filter," arXiv preprint arXiv:1505.00996, 2015.

Z. Farbman, R. Fattal, D. Lischinski, and R. Szeliski, "Edge-preserving decompositions for multi-scale tone and detail manipulation," ACM Trans. Graph., vol. 27, No. 3, pp. 67:1-67:10, Aug. 2008. [Online]. Available: http://doi.acm.org/10.1145/1360612.1360666.

J. Wulff, D. J. Butler, G. B. Stanley, and M. J. Black, "Lessons and insights from creating a synthetic optical flow benchmark," in Computer Vision-ECCV 2012. Workshops and Demonstrations. Springer, 2012, pp. 168-177.

D. Sun, "A modern matlab implementation of the horn & schunck method," 2009.

C. Bailer, B. Taetz, and D. Stricker, "Flow fields: Dense correspondence fields for highly accurate large displacement optical flow estimation," in Proceedings of the IEEE International Conference on Computer Vision, 2015, pp. 4015-4023.

A. Gabiger-Rose, M. Kube, R. Weigel, and R. Rose, "An fpga-based fully synchronized design of a bilateral filter for real-time image denoising," Industrial Electronics, IEEE Transactions on, vol. 61, No. 8, pp. 4093-4104, Aug. 2014.

P. Milanfar, "A tour of modern image filtering: New insights and methods, both practical and theoretical," Signal Processing Magazine, IEEE, vol. 30, No. 1, pp. 106-128, Jan. 2013.

C. Pal, K. Chaudhury, A. Samanta, A. Chakrabarti, and R. Ghosh, "Hardware software co-design of a fast bilateral filter in fpga," in India Conference (INDICON), 2013 Annual IEEE, Dec. 2013, pp. 1-6.

\* cited by examiner

EDGE-AWARE SPATIO-TEMPORAL FILTERING AND OPTICAL FLOW ESTIMATION IN REAL TIME

BACKGROUND

Field of the Invention

Embodiments of the disclosure presented herein relate to image and video processing and, more specifically, to efficient edge-aware spatio-temporal filtering and optical flow estimation that may be performed in real time.

Description of the Related Art

Edge-aware filters are an important tool in many image and video applications, such as high-dynamic range (HDR) tone mapping, stylization, and detail manipulation. As used herein, filtering generally refers to combining pixel values, over space or time, according to a filter kernel that defines filter weights. Edge-aware filters in particular make use of information about image edges in the filtering process and are space-variant (i.e., their kernel is dependent on the input data).

Traditional spatio-temporal edge-aware filters have two major drawbacks that impede their use in real-time filtering of videos. First, such filters either operate iteratively on complete video volumes (i.e., all the frames in a video) or on sliding windows of video frames, which require the entire video volume or sliding window of video frames to be stored in memory, thereby incurring high processing latency and requiring access to a large memory with high bandwidth. Second, such filters require accurate optical flow information as input in order to align neighboring frames for temporal filtering, but accurate optical flow is difficult to obtain efficiently with traditional techniques.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the embodiments disclosed herein are attained and can be understood in detail, a description of embodiments of this disclosure may be had by reference to the appended drawings.

It is to be noted, however, that the appended drawings illustrate only typical embodiments and are therefore not to be considered limiting of its scope, for this disclosure may admit to other equally effective embodiments.

Figure 1:
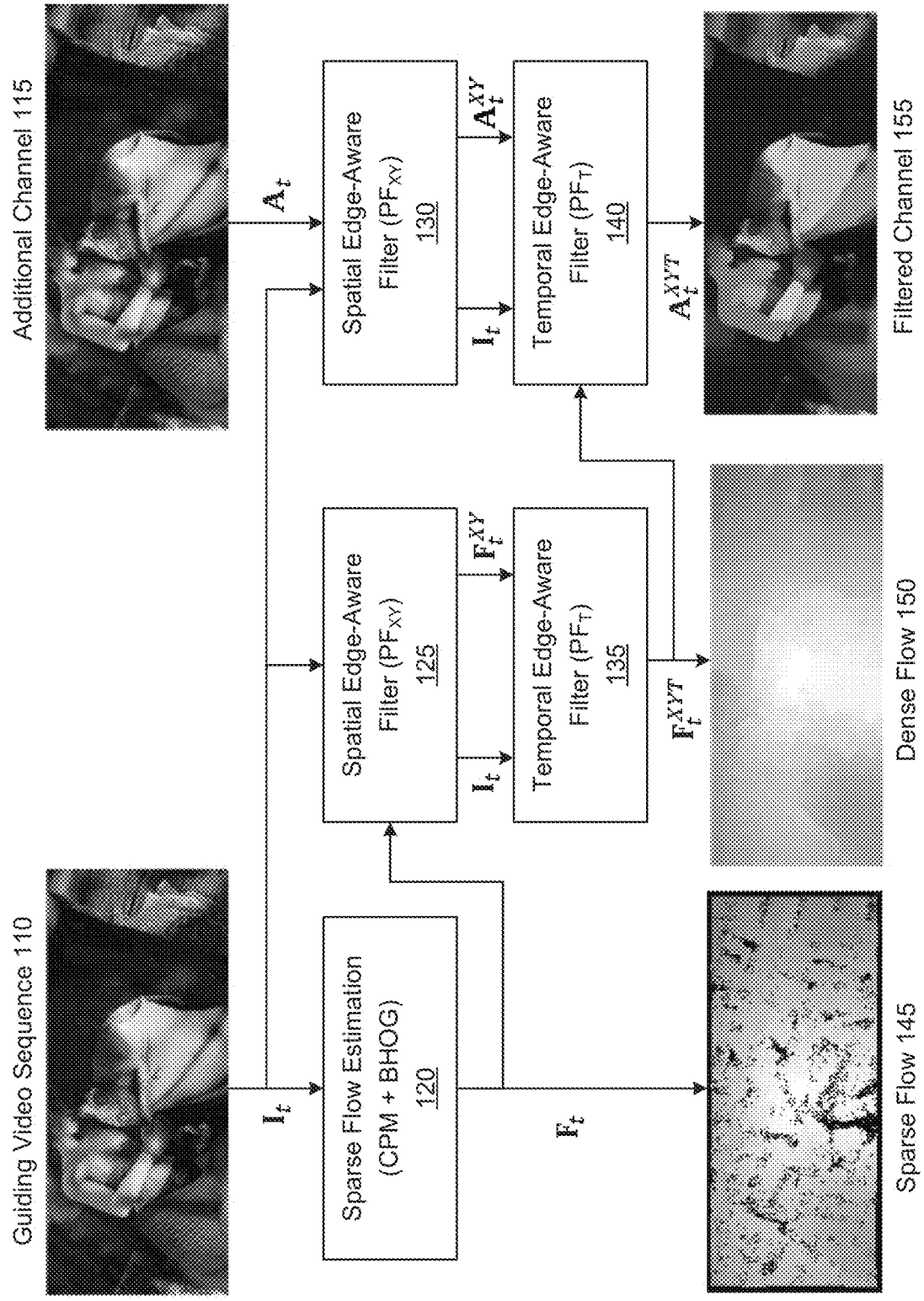

FIG. 1 illustrates an edge-aware filtering pipeline, according to an embodiment.

Figure 2:
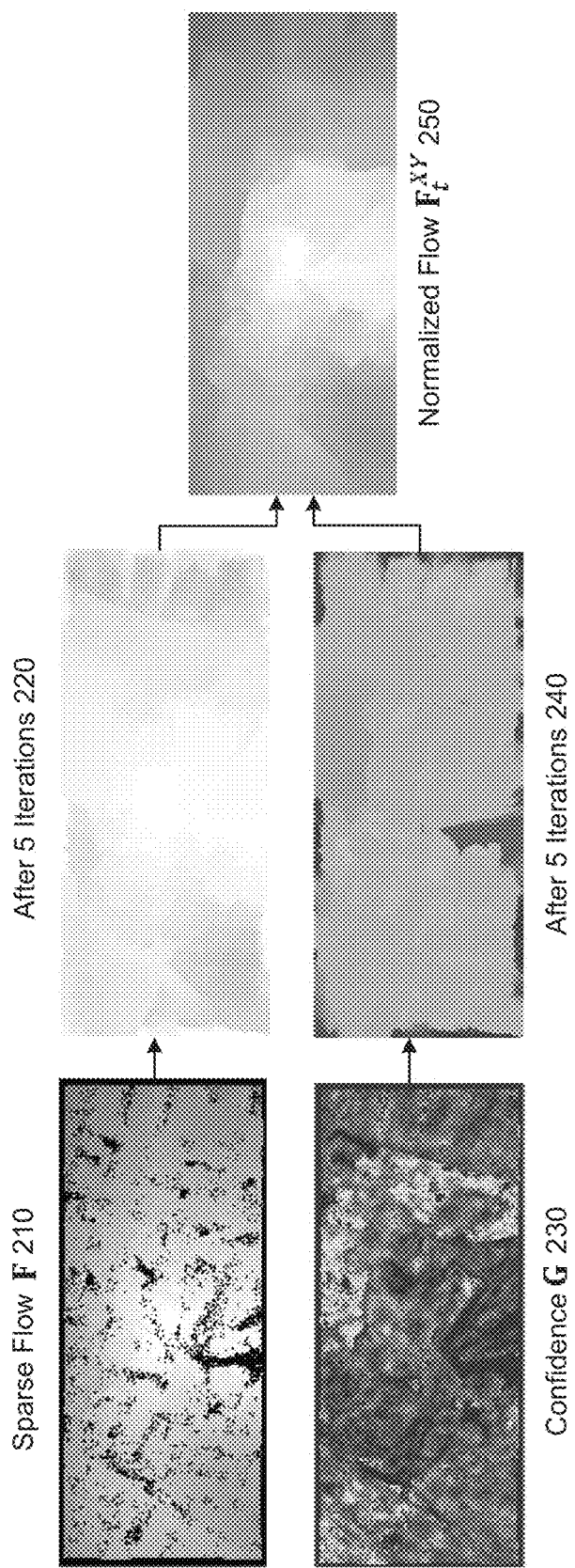

FIG. 2 illustrates an example edge-aware spatial filtering of sparse optical flow data, according to an embodiment.

Figure 3:
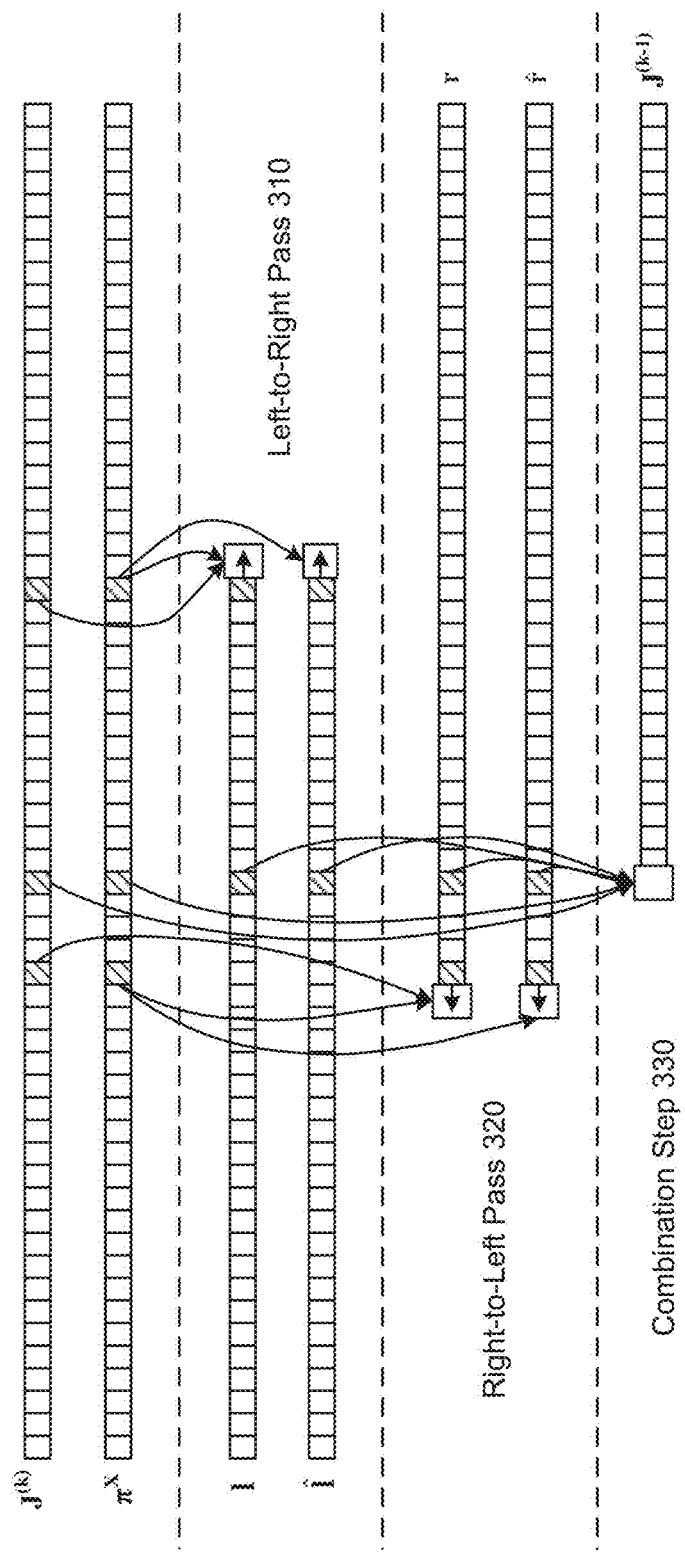

FIG. 3 illustrates an efficient formulation of filtering using scan-line passes, according to an embodiment.

Figure 4:
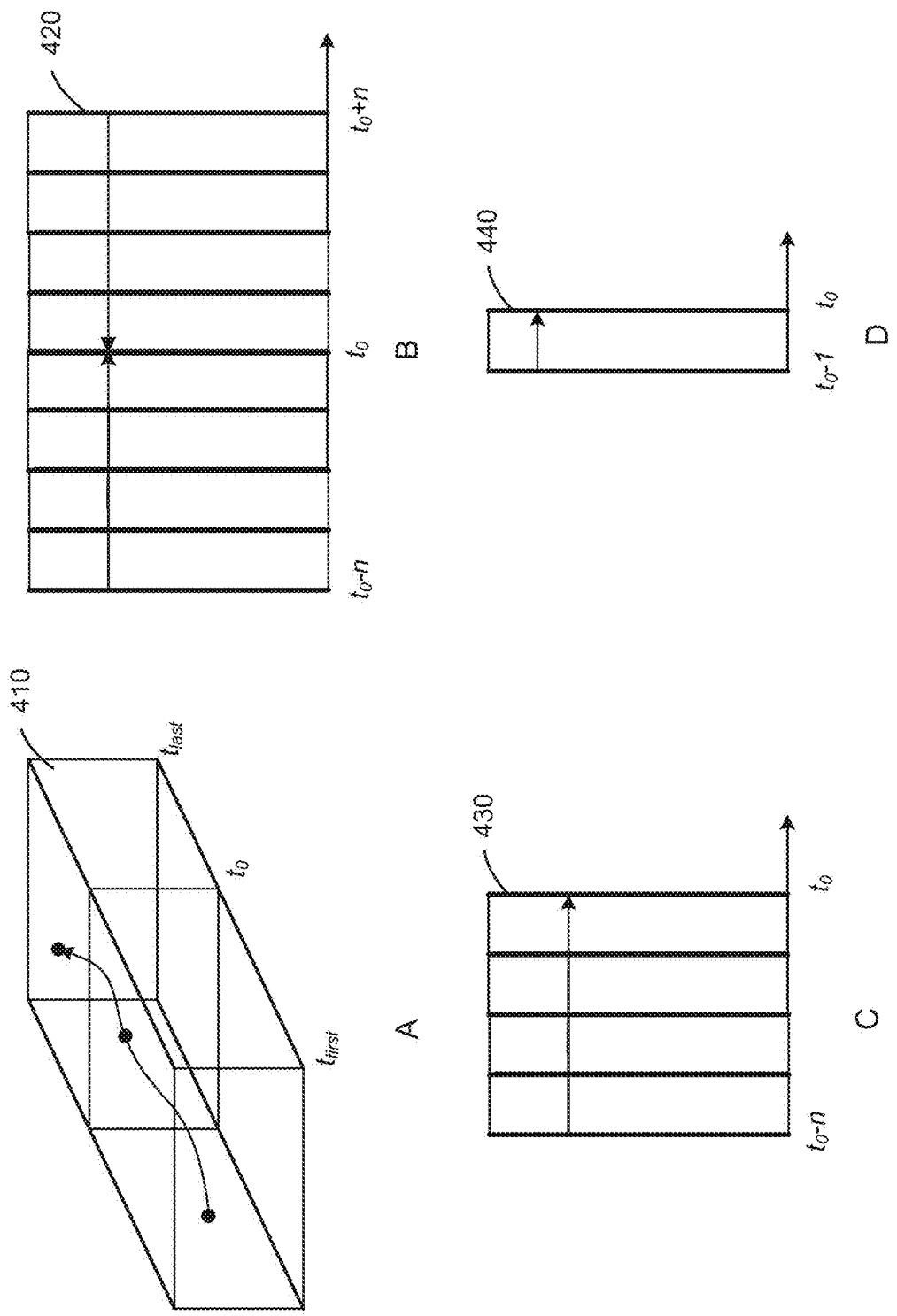

FIG. 4 illustrates temporal filtering using a nonlinear infinite impulse response filter, according to an embodiment.

Figure 5:
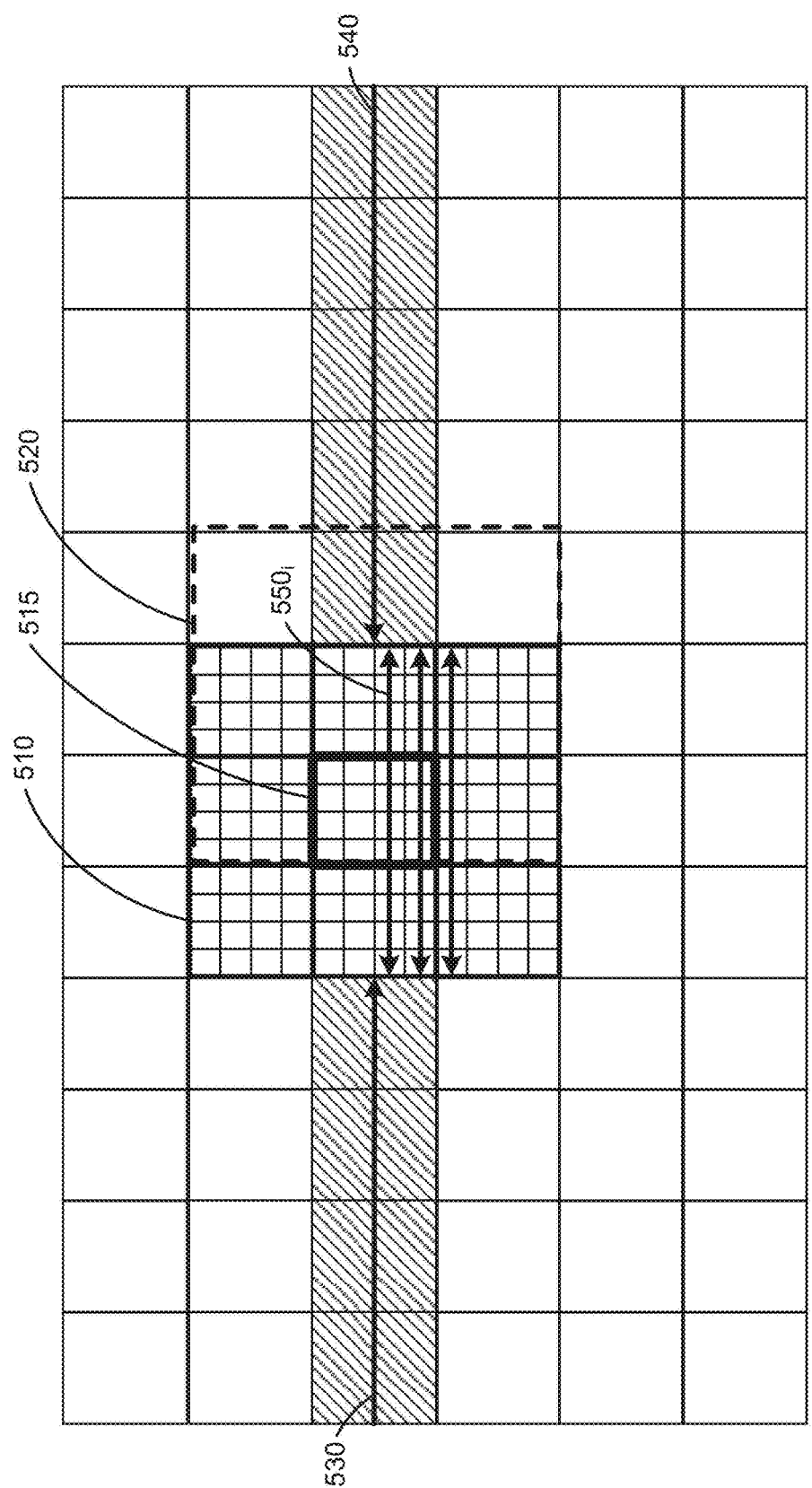

FIG. 5 illustrates an approach for determining initial conditions at tile edges for a horizontal spatial filtering iteration within a tile, according to an embodiment.

Figure 6:
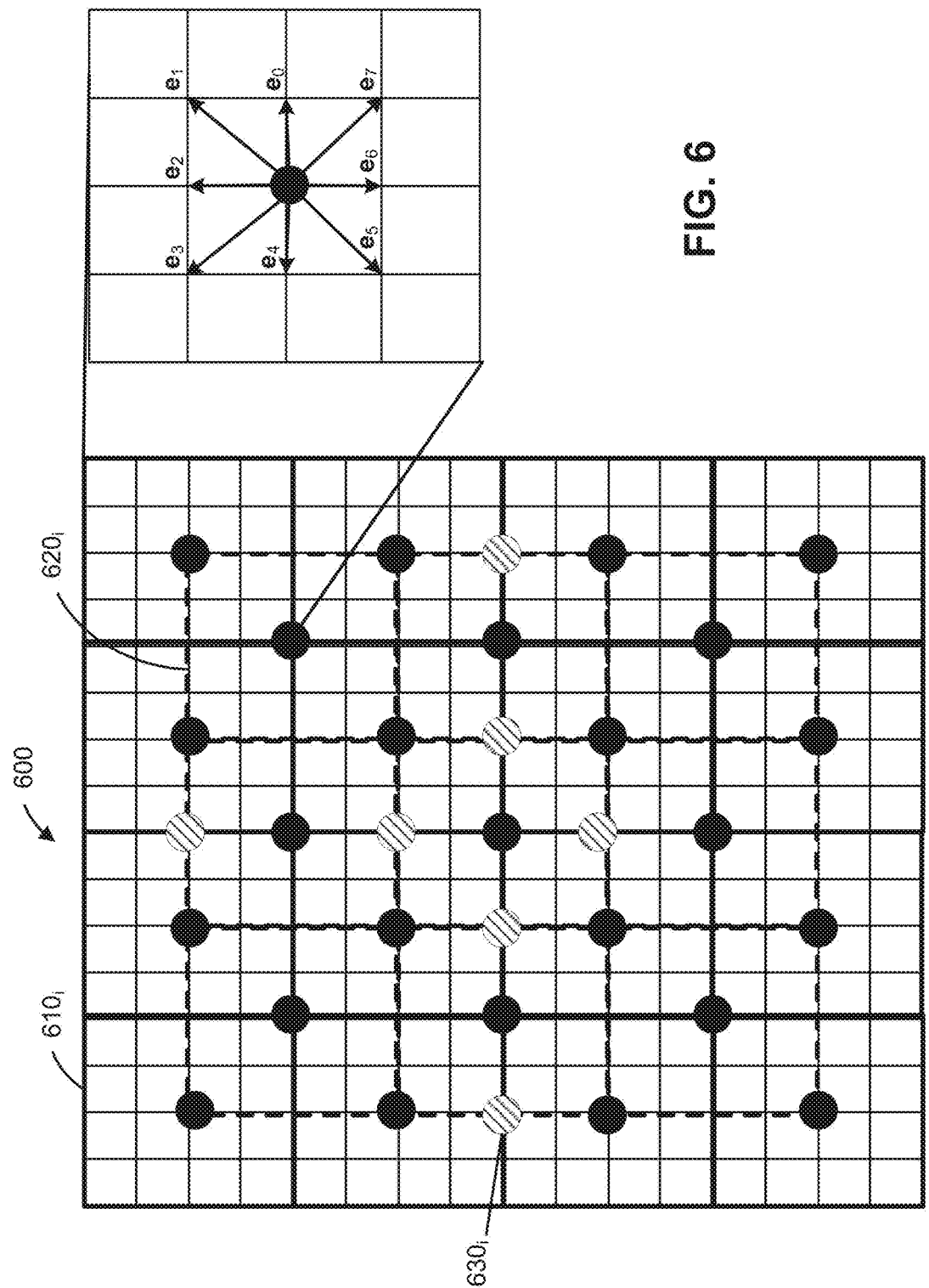

FIG. 6 illustrates the layout of a binarized octal orientation maps (BOOM) descriptor, according to an embodiment.

Figure 7:
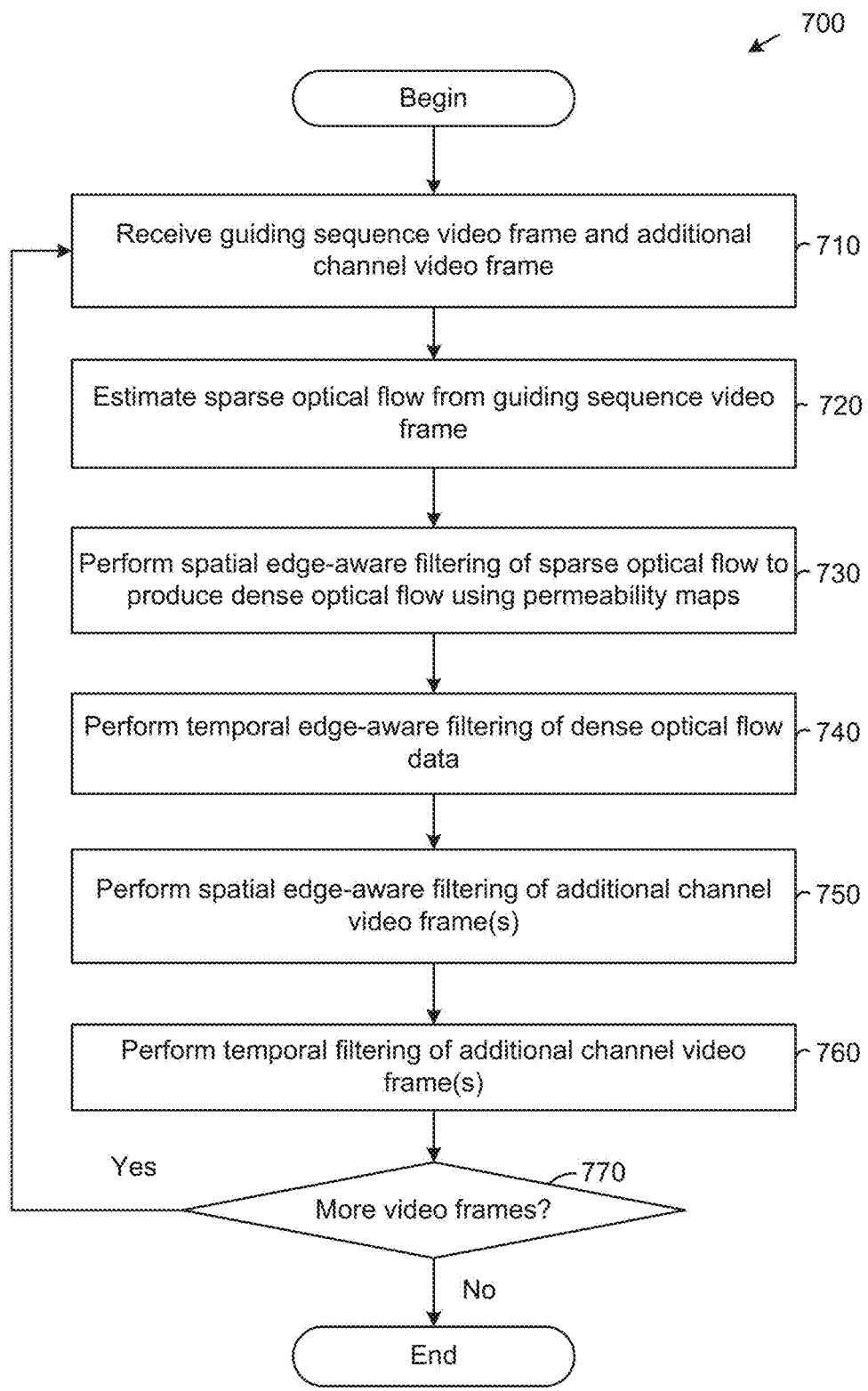

FIG. 7 illustrates a method of filtering video frames, according to an embodiment.

Figure 8:
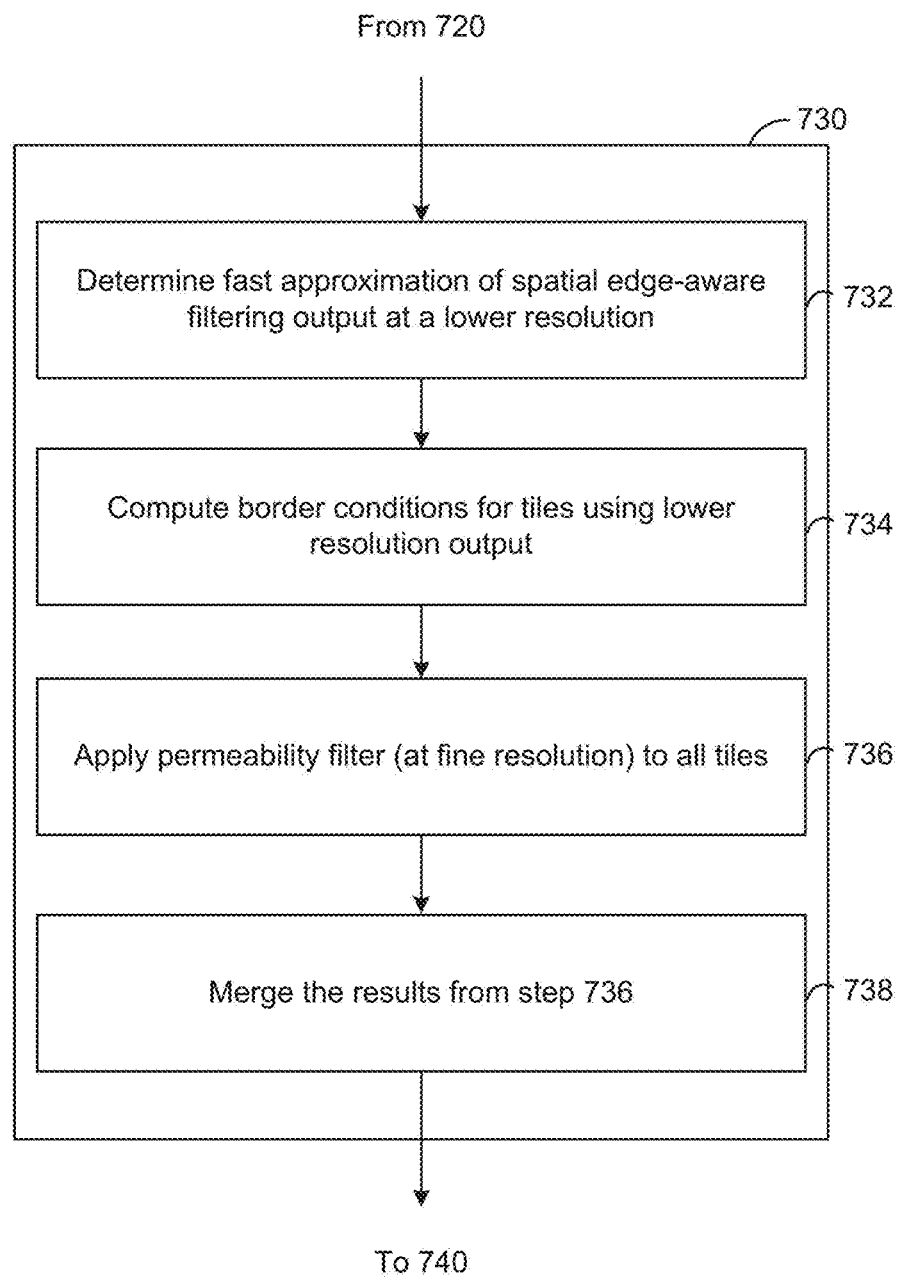

FIG. 8 illustrates in greater detail one of the steps of the method of FIG. 7, according to an embodiment.

Figure 9:
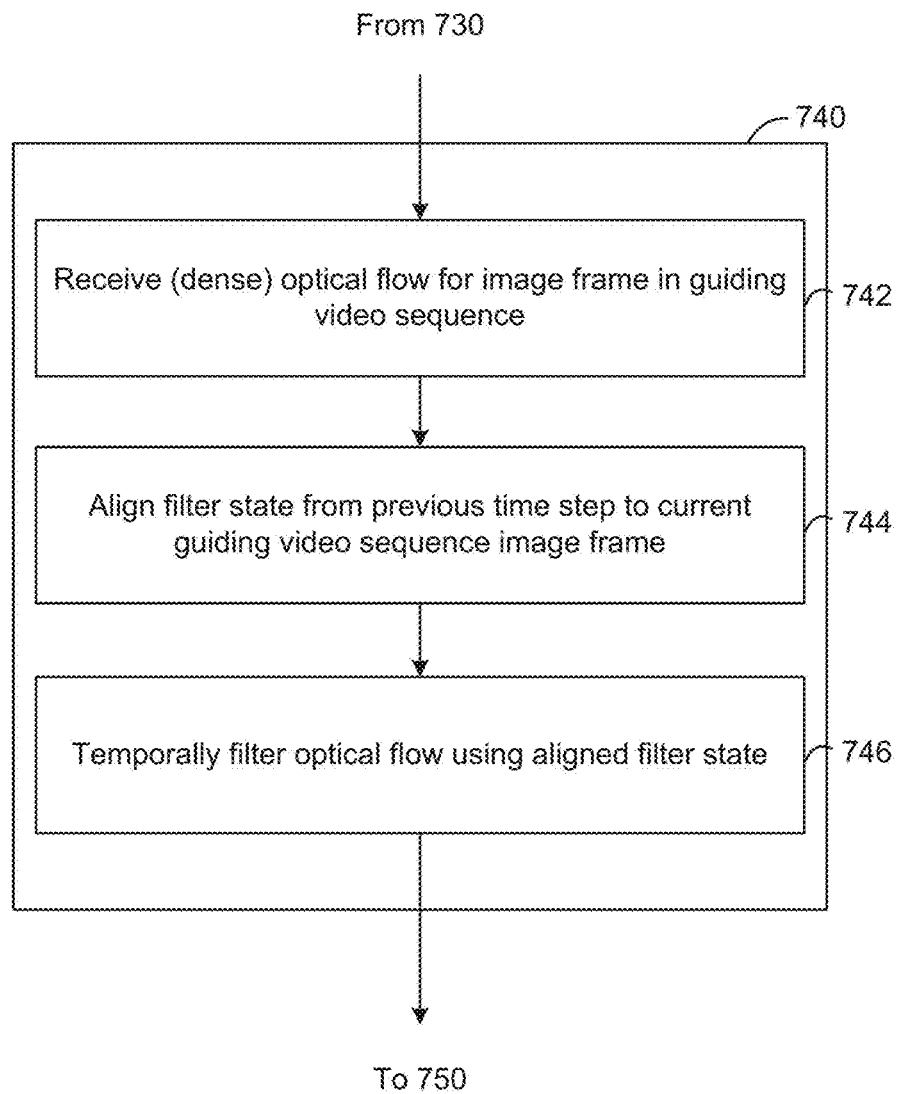

FIG. 9 illustrates in greater detail another one of the steps of the method of FIG. 7, according to an embodiment.

Figure 10:
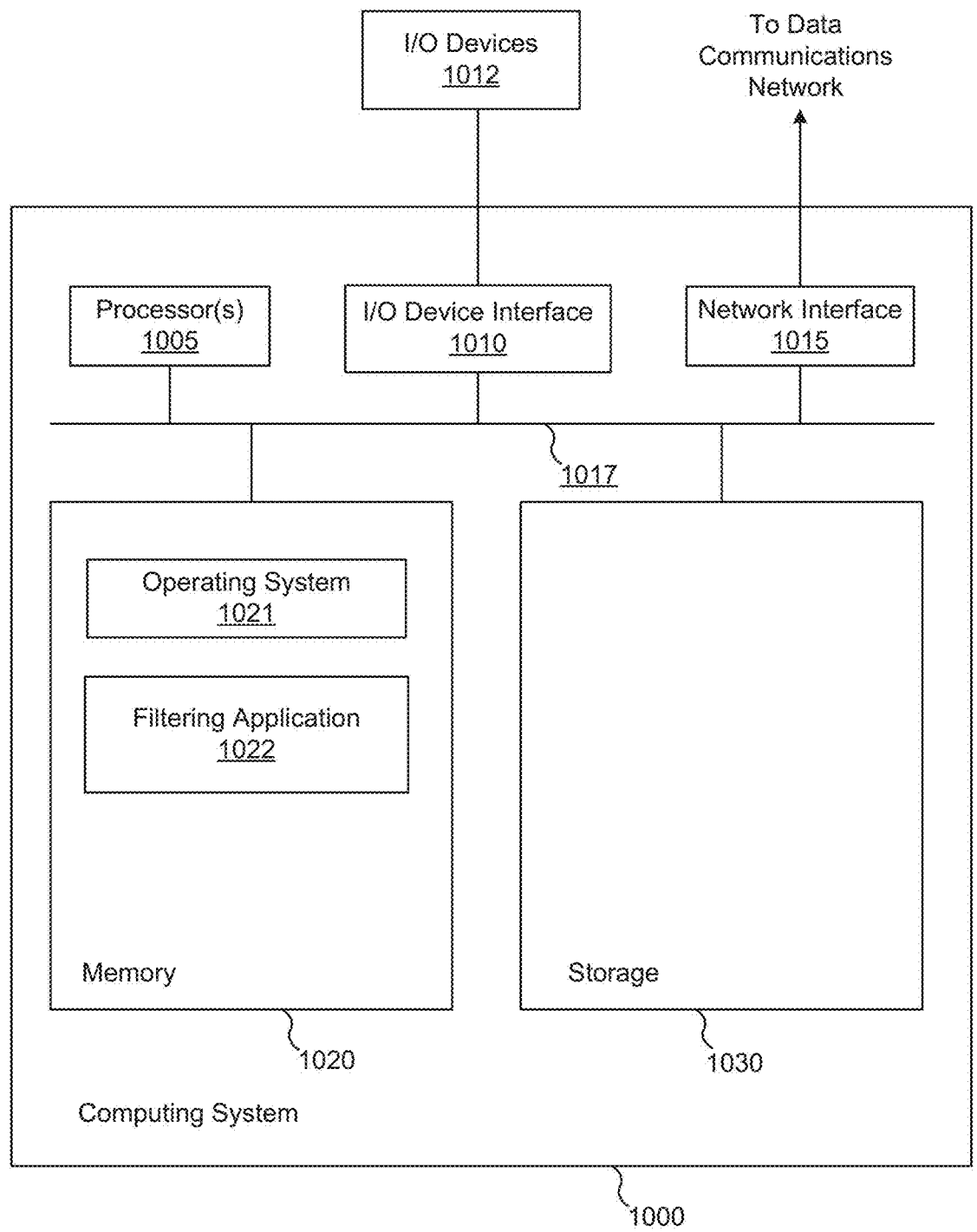

FIG. 10 illustrates a computer system in which an embodiment of this disclosure may be implemented.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the disclosure presented herein provide an approach for edge-aware spatio-temporal filtering that is efficient and may be applied to many image and video applications such as high-dynamic range (HDR) tone mapping, stylization, and detail manipulation. In one embodiment, a filtering application receives as input a guiding video sequence as well as video sequence(s) from additional channel(s). The additional channel(s) may include feature map(s) with, e.g., disparity or saliency values, depending on the image or video application. The filtering application first estimates a sparse optical flow from the guiding video sequence. As used herein, optical flow refers to the vector field describing the apparent motion of individual pixels between two neighboring frames. To obtain fast and accurate optical flow estimates, the filtering application employs a binary feature descriptor integrated into the Coarse-to-fine PatchMatch (CPM) method to compute a quasi-dense nearest neighbor field, which is used as a sparse optical flow initialization. The binary feature descriptor in a particular embodiment may be formulated as a collection of binarized octal orientation maps (BOOMs) on spatial bins arranged in a quincunx pattern and additional bins around a center of an image region. As used herein, an "orientation map" refers to the responses of clamped gradient projections. Having obtained the sparse optical flow, the filtering application then performs spatial edge-aware filtering of the sparse optical flow to interpolate the sparse flow and obtain a dense optical flow. In one embodiment, such a spatial edge-aware filtering may employ an efficient evaluation of the permeability filter with only two scan-line passes per iteration (with, e.g., k=2, 3, or 5 iterations). In addition to the spatial edge-aware filtering of the sparse optical flow, the filtering application also performs spatial edge-aware filtering of the additional channel(s) using the two scan-line pass per iteration permeability filter. Further, the filtering application performs temporal edge-aware filtering of the dense optical flow using a nonlinear infinite impulse response filter, which only requires one filter state updated based on new guiding video sequence video frames and which provides constant complexity in memory requirements and computations per pixel. The resulting optical flow may then be used in temporal edge-aware filtering of the additional channel(s) using the nonlinear infinite impulse response filter.

One particular embodiment provides a computer-implemented method for video filtering. The method generally includes receiving an optical flow for a video frame in a video sequence. The method further includes temporally filtering the optical flow using at least an edge-aware filter in time. The edge-aware filter in time uses at least an optical flow from a previous time step to align a filter state from the previous time step to the video frame. Another embodiment provides a computer-implemented method for determining correspondences between a first image and a second image. The method generally includes determining, for each of a plurality of points in the first image and in the second image, values of a binary descriptor formulated as a collection of binarized octal orientation maps on spatial bins around a center of an associated region of the image. The method further includes comparing the determined binary descriptor values of points in the first image with the determined binary descriptor values of points in the second image to determine correspondences. Further embodiments include a non-transitory computer-readable storage medium storing instructions that when executed by a computer system cause the computer system to perform the methods set forth above, and a computer system programmed to carry out the methods set forth above.

FIG. 1 illustrates an edge-aware filtering pipeline 100, according to an embodiment. As shown, the inputs to the filtering pipeline 100 are a guiding video sequence $I_t$, and additional attribute channels $A_t$ to be filtered. Although one video frame 110 of the guiding sequence $I_t$ and one video frame of the additional channel $A_t$ are shown for illustrative purposes, it should be understood that the filtering pipeline 100 may generally be repeated for multiple video frames in succession, such as the video frames of a live video stream, and multiple attribute channels may also be filtered using techniques disclosed herein. Further, although the additional channel $A_t$ is shown as being the same as the guiding sequence $I_t$, the additional channel $A_t$ may generally be any feature map such as a feature map including disparity or saliency values, depending on the image or video application. The additional channel $A_t$ may also include sparse data (e.g., sparse disparity maps). In addition, although entire video frames of the guiding sequence $I_t$ and the additional channel $A_t$ are shown as being processed, in an alternative embodiment smaller tiles including portions of the guiding sequence frames and the additional channel frames may be processed independently inside a spatial filter and the results merged together to produce the final filtered output, as discussed in greater detail below. In such a case, the tiles may be partially overlapping, with each of the tiles having a border area around it that overlaps with neighboring tiles, and the tiles may further have initial conditions for the filter so that average color mismatches among tiles can be compensated for. As opposed to complete video frames, such small tiles may have the advantage that they fit into on-chip caches of processors (e.g., graphics processing units (GPUs) or central processing units (CPUs)), which enables faster processing and, due to the fact that the filtering works iteratively on the tiles, lowers the bandwidth pressure on the external memory. That is, tiling helps to reduce the external bandwidth incurred by the iterative nature of the spatial filter. The tiles themselves can be merged before a temporal filter is applied.

The filtering application uses the guiding sequence $I_t$ to estimate optical flow and determine spatially varying filter coefficients for the employed edge-aware filter at all video frame locations. The optical flow and the filter coefficients are then applied to additional channels $A_t$ in order to form the spatially and temporally filtered output $A_t^{XYT}$. More specifically, the guiding sequence frames $I_t$ are used to derive edge-aware filter coefficients $H^{XY}$ and to estimate optical flow $F_t^{XYT}$, with the coefficients $H^{XY}$ then being used to perform spatial filtering operations and the optical flow estimate $F_t^{XYT}$ being used to enable temporal filtering along motion paths. It should be understood that the filtering coefficients $H^{XY}$ are used herein as a conceptual notation but do not actually need to be calculated. Instead, only so-called "permeability maps" may be calculated in a pixel-wise precomputation step, followed by evaluation of the permeability filter using an efficient scan-line pass formulation, as discussed in greater detail below. As shown, the filtering pipeline 100 ultimately outputs sparse $F_t$ and dense $F_t^{XYT}$ flow estimates, as well as filtered channels $A_t^{XYT}$, examples of which are depicted as sparse flow video frame 145, dense flow video frame 150, and filtered channels video frame 155.

Illustratively, the filtering application applies a spatial edge-aware filter, such as the permeability filter $PF_{XY}$, to filter the sparse optical flow $F_t$ and the additional channel $A_t$ in space at 125 and 130. To enable temporal filtering, the filtering application can use optical flow information, which is determined through the following process. First, the filtering application estimates a sparse optical flow $F_t$ using the guiding sequence $I_t$ by computing descriptors at sparse locations (e.g., every third pixel location) in each pair of successive video frames (e.g., video frame 110 and a succeeding video frame) of the guiding sequence $I_1, I_2, I_3, \ldots, I_T$ and extracting corresponding points in the pair of video frames that match based on the computed descriptors. In one embodiment, the filtering application employs a binary descriptor, formulated as a collection of binarized octal orientation maps on spatial bins arranged in a quincunx pattern and additional bins around a center of a video frame region, in conjunction with the Coarse-to-fine PatchMatching technique, with the binary descriptor being more efficient to compute but having similar accuracy as scale-invariant feature transform (SIFT) features and DAISY. It should be understood that binary strings are smaller than the descriptors produced by SIFT and DAISY, so the binary descriptor can use less memory, and in addition the binary descriptor may be computed and matched more efficiently with Hamming distance rather than L2 distance.

Having estimated sparse optical flow $F_t$, the filtering application then applies spatial edge-aware filtering to propagate the sparse flow information to obtain a dense optical flow $F_t^{XYT}$ at 125 and further applies a temporal edge-aware filter $PF_T$ at 135 to obtain a dense optical flow $F_t^{XYT}$ that is consistent across time. That is, the sparse flow $F_t$ is an optical flow of only certain points that approximates the desired optical flow, and the filtering application propagates this optical flow information to other points and further filters the optical flow information along time to obtain the dense flow $F_t^{XYT}$, using information about video frame edges (i.e., in an edge-aware manner). In particular, the filtering application may apply a fast edge-aware interpolation without variational refinement to obtain the dense flow $F_t^{XYT}$. In one embodiment, the temporal edge-aware filter is based on the permeability filter, but reformulated as a nonlinear infinite impulse response filter, which can be incrementally evaluated in time given new video frames, as opposed to requiring a window of video frames or the entire video volume. Doing so may permit efficient, low-latency implementation with constant memory complexity per pixel. The full memory requirement is linear in size, e.g., 0(nm) for a video frame with dimension n×m.

As shown, the dense optical flow $F_t^{XYT}$ itself is input into a temporal edge-aware filter $PF_T$ of the additional channel $A_t$ at 140 to obtain filtered channel video frames such as frame 155. It should be understood that the additional channel temporal filter 140 works on different data than the temporal filter 135 but also requires optical flow information for alignment, and that is why dense optical flow $F_t^{XYT}$ is passed to temporal filter 140. One application that is inherently supported by the edge-aware spatio-temporal filtering technique disclosed herein and does not require the additional channel $A_t$ (i.e., the additional channel is optional) is optical flow estimation, which is needed for filtering along time and obtained as the dense flow $F_t^{XYT}$ discussed above. Other applications which do require the additional channel $A_t$ include disparity estimation in which the depths of points in a scene are determined, base/detail layer decompositions in which video frames of the additional channel $A_t$ are split into detailed and base layers (which may be, e.g., manipulated separately and used in, e.g., HDR tone mapping methods), and filtering along time of visual saliency information indicating which portions of a video frame are visually important, among others. For example, in the case of disparity estimation, the filtering application may take as input into the additional channel $A_t$ correspondences between sparse points in pairs of video frames in space and perform filtering pipeline 100 to obtain filter channel video frames (analogous to frame 155) of dense disparities that are filtered along space and time. In the case of base-detail layer decomposition, the filtering pipeline 100 may be used to obtain a base-detail layer decomposition with smooth details that are temporally consistent such that unwanted flickering is removed. In the case of visual saliency, visual saliency information, obtained using known techniques, may be noisy over time and made more temporally consistent by inputting the visual saliency information into the additional channel $A_t$ and filtering along time.

FIG. 2 illustrates an example edge-aware spatial filtering of sparse optical flow data, according to an embodiment. As discussed, the filtering application first estimates a sparse optical flow F, such as the example sparse flow 210, using a binary descriptor in conjunction with the Coarse-to-fine PatchMatching technique. The filtering application then converts, via a number of spatial filtering iterations, the sparse optical flow F into an optical flow that is dense. In one embodiment, the filtering iterations are performed using the permeability filter, which as used herein refers to a full filter that requires a pre-computation of a permeability map. The following iterations of the permeability filter, using a two scan-line pass approach discussed in greater detail below, are then applied to data that needs to be filtered with respect to the computed permeability map: the sparse flow F (e.g., sparse flow 210), a confidence map G (e.g., confidence map 230), and any additional data channel. Then, normalization is obtained by element-wise division of the output of the flow/divided by the output of the filtered confidence. The result is a normalized optical flow $F^{XY}$ (e.g., flow 250).

In one embodiment, the modified permeability filter used by the filtering application to perform edge-aware spatial filtering belongs to a class of filters which is defined by iterative application of the recurrence equation $$J_p^{(k+1)} = \Sigma_{q \in \Omega} H_{pq} J_p^{(k)} + \lambda^{XY} H_{pp}(A_p - J_p^{(k)}), \quad (1)$$

where $A_p$ denotes the input data to be filtered at position p at frame t and $J_p^{(k)}$ is the diffusion result at position p after k iterations, the set $\Omega$ includes all pixel positions of a frame, and $H_{pq}$ are elements of the row stochastic matrix H that defines the filter. The iteration is initialized with $J^{(0)}=A$. The first term of equation (1) is the actual shift-variant convolution and the second term is a fidelity term with $\lambda^{XY} \in [0,1]$ which can be used to bias the iteration toward the input data A. It has been shown that the choice of $\lambda^{XY}=1$ significantly reduces halo artifacts. The permeability filter is a specific instance of equation (1) with two separate matrices $H^X$ and $H^Y$ for filtering operations in horizontal and vertical directions, respectively. The filtering application applies the horizontal and vertical filtering operations in alternating fashion, with the concatenation of one X and one Y pass constituting one spatial filter iteration. A number of such iterations may be performed, e.g., k=2, 3, or 5 iterations.

The two filtering operation matrices $H^X$ and $H^Y$ are defined via permeability weights $\pi_{pq}$ between two pixels p and q which control the location diffusion strength, i.e., how well colors diffuse through pixels. The permeability between two neighboring pixels p=(x,y) and p'=(x+1,y) is defined as $$\tilde{\pi}_p^X = \left(1 + \left|\frac{\|I_p - I_{p'}\|_2}{\sqrt{3} \cdot \sigma^{XY}}\right|^{\alpha^{XY}}\right)^{-1}, \quad (2)$$

which is a variant of the Lorentzian edge-stopping function, applied to the color distance between p and p' of the guiding sequence frame I. This function evaluates close to 0 if the color distance between the two pixels is high, and 1 if the difference is low. The parameter $\sigma^{XY}$ controls the transition point and $\alpha^{XY}$ the falloff rate. For example, $\sigma^{XY} \approx 0.02$ and $\alpha^{XY}=2$ may be used. Permeabilities between arbitrary pixels are then defined as $$\pi_{pq}^X = \begin{cases} 1 & \text{if } p = q, \\ \prod_{n=p_x}^{q_x-1} \tilde{\pi}_{(n,p_y)}^X & \text{if } p_x < q_x, p_y = q_y \\ \prod_{n=q_x}^{p_x-1} \tilde{\pi}_{(n,p_y)}^X & \text{if } p_x > q_x, p_y = q_y \\ 0 & \text{else.} \end{cases} \quad (3)$$

The final filter coefficients $h_{pq}$ are then obtained by normalizing the pairwise permeabilities as $$H_{pq} = \pi_{pq}^X (\Sigma_{n=1}^w \pi_{(n,p_y),q}^X)^{-1}, \quad (4)$$

where w is the video frame width. Note that the permeabilities in equation (3) are defined such that the filtering operations can reduce to one-dimensional (1D) operations over video frame rows or columns. As discussed in greater detail below with respect to FIG. 3, one embodiment implements the 1D operations with an efficient scan-line formulation.

Although most edge-aware filters are not strictly interpolating filters, they can also be used to efficiently spread sparse data, i.e., to perform an edge aware sparse-to dense conversion. For example, this can be achieved by introducing a normalization map G with nonzero values at sparse sample positions and is zero otherwise. The map G is subject to the same filtering operation which is applied to the corresponding sparse data channels. After K filtering iterations, the map G may be used to normalize the filtered data F element-wise as $F^{XY}=F^{(k)}./G^K$. As discussed, FIG. 2 illustrates the sparse-to-dense conversion of optical flow using such filtering. In another embodiment, the filtering application may further use the normalization map G to incorporate data confidence by assigning values between 0.0 and 1.0 at the sparse sampling positions in order to give more weight to those samples which are considered be more accurate than others, as indicated by, e.g., the matching confidence normalized to the range [0.0, 1.0].

FIG. 3 illustrates an efficient formulation of filtering using scan-line passes, according to an embodiment. The multiplicative concatenation of the permeabilities discussed above allows one permeability filter iteration to be formulated as an efficient two-pass scan-line operation with constant computational complexity per pixel and filter iteration. That is, the permeability filter weights are defined as multiplicative chains that are multiplied together, which permits the filter to be implemented as scan-line passes during each iteration of the filter. For brevity, equations will only be provided for the k-th horizontal iteration, as the formulas for vertical iterations are analogous. As shown, given the diffusion result after k iterations $J^{(k)}$ and the permeability map $\tilde{\pi}^X$, the filtering application performs a left-right scan-line pass 310 to obtain intermediate results $l_p$ and $\hat{l}_p$ using the recurrences $$l_p = \tilde{\pi}_{(p_x-1,p_y)}^X (l_{(p_x-1,p_y)} + J_{(p_x-1,p_y)}^{(k)}),$$

$$\hat{l}_p = \tilde{\pi}_{(p_x-1,p_y)}^X (\hat{l}_{(p_x-1,p_y)} + 1.0). \tag{5}$$

In a second right-left scan-line pass 320, the filtering application determines the right-sided quantities $r_p$ and $\hat{r}_p$ as $$r_p = \tilde{\pi}_p^X (r_{(p_x+1,p_y)} + J_{(p_x+1,p_y)}^{(k)}),$$

$$\hat{r}_p = \tilde{\pi}_p^X (\hat{r}_{(p_x+1,p_y)} + 1.0). \tag{6}$$

The filtering application may then calculate the final result (for the k-th horizontal iteration) by combining and normalizing the intermediate results and adding the bias term $\lambda^{XY} \cdot (A_p - J_p^{(k)})$ as $$J_p^{(k+1)} = \frac{l_p + (1-\lambda^{XY}) \cdot J_p^{(k)} + \lambda^{XY} \cdot A_p + r_p}{\hat{l}_p + 1.0 + \hat{r}_p}. \tag{7}$$

The filtering application may efficiently perform this third step of calculating the final result on-the-fly during the right-left pass, as all intermediate results are available at position p at this point. As a result, the entire procedure results in exactly two scan-line passes per iteration. In one embodiment, individual scan-lines of one X or Y iteration are independent and may be parallelized. In addition, the initial values of $l_{(1,p_y)}$, $\hat{l}_{(1,p_y)}$, $r_{(w,p_y)}$, and $\hat{r}_{(w,p_y)}$ (with w being the video frame width) may all be set to zero at the beginning of the procedure. Note that this scan-line pass formulation has the additional advantage that the filter coefficient matrices $H^X$ and $H^Y$ are not formed explicitly. Only the permeability maps $\tilde{\pi}^X$ and $\tilde{\pi}^Y$ have to be explicitly calculated from the guiding video sequence prior to the filtering iterations.

FIG. 4 illustrates temporal filtering using a nonlinear infinite impulse response filter, according to an embodiment. In one embodiment, the temporal filter is formulated in an incremental fashion, which allows the filter to be evaluated efficiently and with constant memory complexity per pixel. That is, rather than requiring the filtering application to process a complete video volume 410 or a temporal sliding window 420 (e.g., of ±10 spatially aligned frames), both of which can require a large amount of high-bandwidth memory to store the video volume or sliding window, techniques disclosed herein employ a nonlinear infinite impulse response filter in time, with the state of the filter from frame t−1 being merged with the next frame t as shown in 440. As discussed in greater detail below, this is similar to making one scan-line pass from left to right, but along time rather than space. When considering the last frame of a sequence, a backward pass is not necessary as intermediate results are already available, hence enabling an incremental formulation resembling a nonlinear infinite impulse response filter in time.

To obtain the nonlinear infinite impulse response filter, two assumptions are made. First, it is assumed that only one time iteration T is applied after the spatial XY iterations. This assumption is valid in practice, as one T iteration is enough to considerably improve temporal consistency. In addition, using only one T iteration eliminates the "chicken-and-egg" problem that would otherwise arise when the dense optical flow estimate used in frame alignment is bootstrapped using the filter itself. Second, it is assumed that all data to be filtered, $J_t^{XY}$, has been aligned to the centering frame $t_0$ within a certain temporal neighborhood $\mathcal{T} = [t_0-n, \ldots, t_0, \ldots t_0+n]$, $n \in \mathbb{N}^+$. The fact that this assumption implicitly requires the availability of optical flow for these frames in order to perform the alignment may be ignored, as this does not pose a problem in the incremental formulation.

With the two assumptions discussed above, one T filtering iteration may be calculated with the same recurrence equations as the equations (5) and (6), but using temporal permeabilities $\pi_t^T$, which are discussed in greater detail below. That is, intermediate results $l_t$, $\hat{l}_t$, $r_t$, $\hat{r}_t$ may be determined, where a left-right pass corresponds to a forward pass in time and vice versa for the right-left pass (with the bold symbols representing full-frame matrices, indexed by the frame number t). The result of one T filtering iteration for the frame at time $t_0$ is then given by $$J_{t_0}^{XYT} = \frac{(l_{t_0} + (1-\lambda^T) \cdot J_{t_0}^{XY} + \lambda^T \cdot A_{t0} + r_{t_0})}{(\hat{l}_{t_0} + 1.0 + \hat{r}_{t_0})}. \tag{8}$$

The problem may further be simplified by replacing the symmetric temporal neighborhood with a causal, one-sided time window $\mathcal{T} = [t_0-n, \ldots, t_0,]$, $n \in \mathbb{N}^+$, which is shown as the time window 430 in panel C. This is a valid simplification, especially for real-time settings where low-latency is required and no information about future frames after $t_0$ is available. Observe that the recurrence equation then reduces to $$J_{t_0}^{XYT} = \frac{(l_{t_0} + (1-\lambda^T) \cdot J_{t_0}^{XY} + \lambda^T \cdot A_{t0})}{(\hat{l}_{t_0} + 1.0)}, \tag{9}$$

as $r_{t_0}$ and $\hat{r}_{t_0}$ are zero in this case. This means that one temporal iteration may be calculated using just one left-right pass. By letting $n \to \infty$ and by considering the fact that the left-right pass is defined as a recurrence, it is possible to obtain a nonlinear infinite impulse response filter in time which only requires one recurrence evaluation for each time step. The only missing part to consider is alignment. Recall that it was assumed that all frames within $\mathcal{T}$ are aligned to the frame $t_0$ in the first place. In order to drop this assumption and reuse the nonlinear infinite impulse response filter state of the previous time-step $t_0-1$ to update the recurrence equation, the filtering application re-aligns the nonlinear infinite impulse response filter to the current frame $t_0$ using forward-warping based on the flow estimate of $F_{t_0-1}^{XYT}$, which is already computed and available:

$$l_{t_0} = \tilde{\pi}_{t_0}^T warp_{F_{t_0-1}^{XYT}}(l_{t_0-1} + J_{t_0-1}^{XYT}),$$

$$\hat{l}_{t_0} = \tilde{\pi}_{t_0}^T warp_{F_{t_0-1}^{XYT}}(\hat{l}_{t_0-1} + 1.0). \tag{10}$$

Note that this recurrence step can be efficiently implemented with constant memory per pixel requirements and low latency. In one embodiment, the forward mapping operator $$warp_{F_{t_0-1}^{XYT}}(.)$$

is implemented using the elliptic-weighted average (EWA) splitting framework, which is an efficient high-quality resampling technique for non-linear image transformations.

The temporal permeabilities $\tilde{\pi}_t^T$ used in the filtering iteration discussed above may be derived as follows. A combination of color constancy and flow-gradient magnitude may be used to calculate permeabilities in the temporal direction. Photo constancy is a straightforward extension of the spatial permeabilities $$\tilde{\pi}_t^{photo} = \left(1 + \left|\frac{\|I_t - warp_{F_{t-1}^{XYT}}(I_{t-1})\|_2}{\sqrt{3} \cdot \sigma^{photo}}\right|^{\alpha^{photo}}\right)^{-1} \quad (11)$$

and allows filtering along motion paths with similar color values (division and exponentiations are all element-wise). The gradient-magnitude measure is calculated similarly as $$\tilde{\pi}_t^{grad} = \left(1 + \left|\frac{\|F_t^{XY} - warp_{F_{t-1}^{XYT}}(F_{t-1}^{XYT})\|_2}{\sqrt{2} \cdot \sigma^{grad}}\right|^{\alpha^{grad}}\right)^{-1}, \quad (12)$$

which is simple to evaluate like equation (11). The gradient-magnitude measure of equation (12) prevents temporal filtering in video frame regions with complex motion where flow and warping artifacts are likely to occur. In other words, this measure introduces a bias toward the current frame in regions where temporal filtering may introduce errors. The final temporal permeabilities $\tilde{\pi}_t^T$ are obtained by element-wise multiplication of the two measures of equations (11) and (12): $\tilde{\pi}_t^T = \tilde{\pi}_t^{photo} \cdot \tilde{\pi}_t^{grad}$.

Returning to spatial filtering, FIG. 5 illustrates an approach for determining initial conditions at tile edges for a horizontal spatial filtering iteration within a tile, according to an embodiment. A similar approach may be used for a vertical spatial filtering iteration within the tile. As discussed, in an optimized embodiment of the spatial permeability filter, smaller tiles including portions of the guiding sequence video frames and the video frames to be filtered (e.g. sparse flow or additional channels), rather than the entire video frames, may be processed separately, with the tiles having overlapping bordering regions. For example, the tiles (e.g., tile 510 and 520) may be completely overlapping and have a dimension of 48×48 pixels, where the overlap border amounts to 16 pixels around a core region of 16×16 pixels (e.g., core region 515 of the tile 510). When processed individually, such small tiles may be stored entirely in the CPU or GPU cache, which may reduce the required off-chip memory bandwidth in cases where many spatial filtering iterations are applied in succession. Filtered, neighboring tiles may be combined using any feasible blending profile. In case of completely overlapping tiles, a piecewise linear, pyramidal-shaped blending profile may be used to combine neighboring tiles once they have been filtered. In one embodiment, the tiles may optionally have nonzero initial filter values $l_{(1,p_y)}$, $\hat{l}_{(1,p_y)}$, $r_{(w,p_y)}$, and $\hat{r}_{(w,p_y)}$ at the borders so that average color offsets can be compensated for. These values may be piecewise constant for each edge of a tile (e.g., $l_{(1,p_y)}$ values can be the same for several rows within a tile), and may be obtained by first filtering a down-sampled version of the complete video frame in a preprocessing step. It should be appreciated that tiling of the spatial filter represents an optional optimization which may lead to faster runtimes when executed on special accelerator platforms (such as field programmable gate arrays (FPGAs) or GPUs). Further it should be noted that this is an approximation of the global filter formulation which can lead to different numerical results.

In the fully overlapping embodiment of a tiled spatial filter, the nonzero initial conditions at the tile edges may be obtained as explained henceforth. First, the permeability maps $\tilde{\pi}^X$ and $\tilde{\pi}^Y$ and the data to be filtered J are resampled to form the low-resolution representations $\bar{\pi}_X$, $\bar{\pi}^Y$, and $\bar{J}$. The resolution of the coarse representations is chosen such that each pixel in the coarse representation corresponds to a core region of a particular tile. For example, if fully overlapping 48×48 tiles are being used, each pixel in the low-resolution representations corresponds to a 16×16 pixel block, as illustrated in FIG. 5. As shown, the currently processed tile 510 has the core region 515 and overlaps with the neighboring tile 520. While the data to be filtered can be down-sampled using traditional resampling methods, special attention has to be paid to the permeability maps such that the filter behavior is not changed. For a given tile core size s (in the above example we would have s=16), the horizontal low-resolution permeability map can be obtained using a multiplicative reduction in horizontal direction and an averaging operation in vertical direction as $$\bar{\pi}_{(i,j)}^X = \frac{1}{r} \sum_{y=cy(i,j)-s/2}^{cy(i,j)+s/2} \left(\prod_{x=cx(i,j)-s/2}^{cx(i,j)+s/2} \tilde{\pi}_{(x,y)}^X\right), \quad (13)$$

where cx(i,j) and cy(i,j) return the tile center coordinates in the full-resolution video frame, and $$(i, j) \in \left[1, \lceil\frac{w}{r}\rceil\right] \times \left[1, \lceil\frac{h}{r}\rceil\right].$$

The expression for $\bar{\pi}^Y$ follows analogously by swapping the x and y indices. As illustrated in FIG. 5, the initial conditions $l_{(1,p_y)}$, $\hat{l}_{(1,p_y)}$, $r_{(3s,p_y)}$, and $\hat{r}_{(3s,p_y)}$ for the horizontal filtering iteration within a particular tile of size 3s can now be determined by performing (incomplete) left-right 530 and right-left 540 passes on the low resolution representations, starting at the video frame boundary and stopping at the tile 510's borders. The same procedure can be carried out in the vertical direction in order to determine initial conditions for the vertical filter iterations along the columns. It should be noted that due to the subsampling, s neighboring rows or columns can share the same initial conditions. Once the initial conditions have been derived for a particular tile, the XY filtering iterations can be carried out iteratively within the tile in the same manner as discussed in the non-tiled version of the XY filter. In particular, individual rows 550; within the tile 510 are processed using the four initial values $l_{(1,p_y)}$, $\hat{l}_{(1,p_y)}$, $r_{(3s,p_y)}$, and $\hat{r}_{(3s,p_y)}$ obtained from the left-right 530 and right-left 540 passes on the low-resolution data, with the rows sharing the same initial values. Once all tiles have been filtered, these can be merged to form a complete output video frame using a linear blending profile.

FIG. 6 illustrates the layout of a binarized octal orientation maps (BOOM) descriptor, according to an embodiment. As discussed, the filtering application uses the BOOM descriptor to match corresponding points in pairs of video frames during sparse flow estimation 120. In one embodiment, the BOOM descriptor combines orientation maps with a normalized binarization scheme in order to produce a descriptor with similar performance and regular layout as SIFT and DAISY, but with the computational efficiency of a binary descriptor. The input to the BOOM descriptor is a normalized 18×18 pixel patch P, which the filtering application first preprocesses with Prewitt operators in order to obtain the gradients $g_j=[G_j^h, G_j^v]$ within a 16×16 pixel support $S^{16 \times 16}$, shown in FIG. 6 as 16×16 pixel patch 600:

$$G^h = P * \begin{bmatrix} 1 & 0 & -1 \\ 1 & 0 & -1 \\ 1 & 0 & -1 \end{bmatrix}, G^v = P * \begin{bmatrix} 1 & 1 & 1 \\ 0 & 0 & 0 \\ -1 & -1 & -1 \end{bmatrix}. \quad (14)$$

BOOM is formulated as a collection of binarized orientation maps on 4×4 pixel cells (spatial bins) 610$_i$ arranged in a quincunx pattern. In addition, 7 bins 620$_i$ are added around the center region in order to align the amount of bins with a power of 2. Orientation maps are built within these 32 spatial bins using eight directions $e_0$-$e_7$ as $$b_{ki} = \Sigma_{j \in \mathcal{N}_k^{4 \times 4}} \max(0, \langle e_i, g_j \rangle), \quad (15)$$

where $b_{ki}$ are the orientation map responses and $\mathcal{N}_k^{4 \times 4}$ denotes the 4×4 pixel neighborhood of the $k^{th}$ spatial bin. Vector projections onto the following directions are used $$[e_0 \ldots e_7] = \begin{bmatrix} 1 & 1 & 0 & -1 & -1 & -1 & 0 & 1 \\ 0 & 1 & 1 & 1 & 0 & -1 & -1 & -1 \end{bmatrix} \quad (16)$$

to calculate the gradient contribution to a specific orientation map. Negative projections are clamped to zero, which has the advantage that angles do not have to be calculated explicitly. Overall, the result is 32×8=256 orientation map responses $b_{ki}$. That is, each pixel is projected onto the different directions, which does not require any trigonometric function evaluation, and the projections are accumulated as the orientation map responses. Note, the use of unnormalized vectors and Prewitt masks is intentional and allows operations to be implemented with integer additions.

To obtain good descriptor performance, the orientation map responses $b_{ki}$ should be normalized. However, straightforward normalization requires the computation of costly $L_2$ norms and divisions. Instead, a simple approximation of the average gradient magnitude which can be carried out with integer arithmetic may be computed as $$s = \Sigma_{j \in S^{16 \times 16}} 5 \cdot \max(|g_j^0|, |g_j^1|) + 3 \cdot (|g_j^0| + |g_j^1|). \quad (17)$$

The normalization of this approximation with (5+3)=8 is implicitly carried out in the binarization step $$d_{ki} = \begin{cases} b_{ki} \cdot \theta_0 > s, & \text{if } i \text{ even} \\ b_{ki} \cdot \theta_1 > s, & \text{if } i \text{ odd} \end{cases}, \quad (18)$$

which yields a binary 256 bit descriptor $d_{ki}$. In this step, the projected accumulated values are compared to the average gradient magnitude to see if the values are greater or less than the average and to obtain binary bits (1s and 0s) based on the comparison, rather than traditional normalization in which division is required. The parameters $\theta_0$ and $\theta_1$ in equation (18) compensate for all normalizations that have been omitted so far. In a particular embodiment, $\theta_0=1024$ and $\theta_1=256$ may be used, which are powers of two and can be implemented with simple bitshifts.

Advantageously, the BOOM descriptor may be efficiently implemented using only integer arithmetic, i.e., no divisions, trigonometric or transcendental functions are required. Further, the performance of the BOOM descriptor is similar to SIFT descriptors with 128 floating-point entries and DAISY descriptors with 200 entries, while at the same time being more efficient than other binary descriptors in terms of processor execution time. Similar to the SIFT-Flow and DAISY methods, BOOM may be implemented as an efficient dense-scan method, since the intermediate orientation map results may be shared among neighboring and overlapping descriptors.

In one embodiment, the filtering application uses the BOOM descriptor to match corresponding points in pairs of video frames during sparse flow estimation 120, with flow vectors being extracted using the Coarse-to-fine PatchMatch method. The CPM method was developed to provide accurate optical flow vectors on a coarse, but regular grid, with a randomized search formulated on subsampled grids over an image pyramid, where matching information is propagated from coarser to finer grids in a top-down fashion. The CPM method traditionally uses SIFT-Flow features to compute costs and provide robust matches. By instead using the BOOM descriptor described herein, the runtime and memory requirement of the CPM method can be significantly decreased. In one embodiment, the following modifications to the CPM method and parametrization may be used. Instead of SIFT-Flow traditionally used in the CPM method, the filtering application uses a dense-scan implementation of BOOM and, in addition, the contrast-limited adaptive histogram equalization (CLAHE) with threshold $\theta_{clahe}=1$ is applied to the input video frames in order to improve performance on low-contrast regions. Instead of performing the forward-backward check on two finest levels, the filtering application performs one check on the coarsest level and one check on the finest level, with outliers on the coarsest level being re-initialized and matching costs being thresholded (e.g., with a threshold of $\theta_{desc}=88$) to remove very bad matches. A slightly relaxed search radius r of 11 may be used instead of the traditional 4, and the forward-backward check threshold $\theta_{flow}$ may be reduced from 3 to 1 pixel, as experience has shown that doing so improves accuracy of the CPM method. In addition, to improve the precision for small flow-vectors, the filtering application performs a quadratic interpolation step by reusing the matching costs on 3×3 neighborhoods around matches returned by the CPM method.

FIG. 7 illustrates a method of filtering video frames, according to an embodiment. As shown, the method 700 begins at step 710, where a filtering application receives a guiding sequence video frame and video frame(s) of (optional) additional channel(s). As discussed, a guiding video sequence is used to determine the edge aware filter coefficients, in terms of the previously described permeability values, as well as to estimate an optical flow that enables temporal filtering along motion paths. The additional channel(s) may include feature map(s) with, e.g., disparity or saliency values, depending on the image or video application, and the edge aware filter coefficients and optical flow determined using the guiding video sequence are used to spatially and temporally filter the additional channel video frame(s).

At step 720, the filtering application estimates a sparse optical flow from the guiding sequence video frame. This step corresponds to operation 120 in the filtering pipeline 100. In one embodiment, the filtering application estimates the sparse optical flow using the modified CPM method with the BOOM descriptor discussed above with respect to FIG. 5, to compute a quasi-dense nearest neighbor field.

At step 730, the filtering application performs spatial edge-aware filtering of the sparse optical flow to produce a dense optical flow using permeability maps obtained from the guiding sequence video frame. This step corresponds to operation 125 in the filtering pipeline 100. In one embodiment, the spatial edge-aware filter that is used may be an efficient formulation of the permeability filter evaluated with two scan-line passes per iteration, as discussed above with respect to FIG. 3.

In another embodiment, discussed in greater detail below with respect to FIG. 8, smaller tiles including portions of the guiding video frames and the additional channel video frame, rather than the entire video frames, may be processed separately in the spatial XY filter, with the tiles having overlapping bordering regions and having initial weights so that average color is the same in the tiles. Such small tiles may be stored entirely in the CPU or GPU, which may be faster than storing video frames a separate memory subsystem.

At step 740, the filtering application performs temporal edge-aware filtering of the dense optical flow data. This step corresponds to operation 120 in the filtering pipeline 100, and the optical flow obtained at step 740 is used in the alignment step of the temporal edge-aware filtering of additional channel(s). In one embodiment, the filtering application may employ the recursive infinite impulse response formulation of the permeability filter discussed above with respect to FIG. 4. As discussed, such an infinite impulse response filter only requires one filter state that is updated based on new guiding video sequence frames, which may be efficiently implemented with constant memory per pixel and low latency.

At step 750, the filtering application performs spatial edge-aware filtering of additional channel video frame(s). This step corresponds to operation 130 in the filtering pipeline 100 and is similar to the spatial edge-aware filtering of the sparse optical flow at step 730.

Then, at step 760, the filtering application performs temporal filtering of the additional channel video frame(s). This step corresponds to operation 140 in the filtering pipeline 100 and is similar to the temporal filtering of the dense optical flow at step 740.

At step 770, if there are more video frames, then the method 700 returns to step 710, where the filtering application receives another guiding sequence video frame and additional channel frame(s).

FIG. 8 illustrates in greater detail step 730 of the method 700, according to an embodiment. As shown, at step 732, the filtering application determines a fast approximation of the spatial edge-aware filtering output at a lower resolution than the full resolution. This is the first step of tiling optimization, which is not a loss-less optimization but is rather an approximate version of the global filter, and the global evaluation has dependencies on the entire row (or column) of a video frame.

At step 734, the filtering application uses the lower resolution output to compute border conditions for tiles. In one embodiment, the border conditions for a horizontal spatial filtering iteration within a tile may be determined according to the approach discussed above with respect to FIG. 5.

At step 736, the filtering application applies the permeability filter (at fine resolution) to all of the tiles. In one embodiment, the permeability map used in such a permeability filter may be obtained using equation (13), discussed above.

Then, at step 738, the filtering application merges the results obtained at step 736. As discussed, filtered, neighboring tiles may be combined using any feasible blending profile, and, in the case of completely overlapping tiles, a piecewise linear, pyramidal-shaped blending profile may be used to combine neighboring tiles that have been filtered in one embodiment.

FIG. 9 illustrates in greater detail step 740 of the method 700, according to an embodiment. As shown, the temporal edge-aware filtering of the dense optical flow data in step 740 includes the filtering application receiving a (dense) optical flow for a video frame in the guiding video sequence at step 742. As discussed, the received dense optical flow may be obtained by first determining a sparse optical flow and then performing spatial edge-aware filtering of the sparse optical flow.

At step 744, the filtering application aligns a filter state from a previous time step to the current guiding video sequence video frame. In one embodiment, the filter state may be that of the nonlinear infinite impulse response filter discussed above, and the filtering application may align such a nonlinear infinite impulse response filter to the current frame using forward-warping based on a flow estimate of a previous frame via the use of EWA splitting.

Then, at step 746, the filtering application temporally filters the optical flow using the aligned filter state. In one embodiment, such a filtering iteration uses the recurrence equations (10) along with the temporal permeabilities that is the product of the photo constancy and gradient-magnitude measure of equations (11)-(12).

FIG. 10 illustrates a system 1000 in which an embodiment of this disclosure may be implemented. As shown, the system 1000 includes, without limitation, processor(s) 1005, a network interface 1015 connecting the system to a network, an interconnect 1017, a memory 1020, and storage 1030. The system 1000 may also include an I/O device interface 1010 connecting I/O devices 1012 (e.g., keyboard, display and mouse devices) to the system 1000.

The processor(s) 1005 generally retrieve and execute programming instructions stored in the memory 1020. Similarly, the processor(s) 1005 may store and retrieve application data residing in the memory 1020. The interconnect 1017 facilitates transmission, such as of programming instructions and application data, between the processor(s) 1005, I/O device interface 1010, storage 1030, network interface 1015, and memory 1020. Processor(s) 1005 is included to be representative of general purpose processor(s) and optional special purpose processors for processing video data, audio data, or other types of data. For example, processor(s) 1005 may include a single CPU, multiple CPUs, a single CPU having multiple processing cores, one or more GPUS, one or more FPGA cards, or a combination of these. And the memory 1020 is generally included to be representative of a random access memory. The storage 1030 may be a disk drive storage device. Although shown as a single unit, the storage 1030 may be a combination of fixed or removable storage devices, such as magnetic disk drives, flash drives, removable memory cards or optical storage, network attached storage (NAS), or a storage area-network (SAN). Further, system 1000 is included to be representative of a physical computing system as well as virtual machine instances hosted on a set of underlying physical computing systems. Further still, although shown as a single computing system, one of ordinary skill in the art will recognized that the components of the system 1000 shown in FIG. 10 may be distributed across multiple computing systems connected by a data communications network.

As shown, the memory 1020 includes an operating system 1021 and a filtering application 1022. The operating system 1021 may be, e.g., Linux®. The filtering application 1022 is configured to perform edge-aware spatio-temporal filtering. In one embodiment, the filtering 1022 may receive a guiding video frame and video frame(s) of (optional) additional channel(s); estimate a sparse optical flow from the guiding sequence video frame; perform spatial edge-aware filtering of the sparse optical flow to produce a dense optical flow using permeability maps obtained from the guiding sequence video frame; perform temporal edge-aware filtering of the dense optical flow data; perform spatial edge-aware filtering of additional channel video frame(s); perform temporal filtering of the additional channel video frame(s); and process in a similar manner any further guiding video frames and video frame(s) of additional channel(s), if any, according to the method 700 discussed above with respect to FIGS. 7-9.

Although discussed herein primarily with respect to filtering videos, it should be understood that aspects of the techniques disclosed herein, such as the spatial permeability filter, may also be used to filter images that are not part of videos.

Advantageously, techniques disclosed herein provide spatio-temporal filtering optimizations, including modifications to the Coarse-to-fine PatchMatch method and a novel binary descriptor, a two scan-line pass per iteration implementation of the permeability filter, and an infinite impulse response filter in time. Unlike traditional edge-aware spatio-temporal filters, the infinite impulse response filter only requires one filter state that is updated based on new video frames, rather than the entire video volume or a sliding window of video frames. As a result, temporal filtering may be achieved with constant memory per pixel complexity irrespective of actual video length, and experience has shown that the quality of the filtering is acceptable. As the video is processed in a single forward pass, the filtering application may filter additional channels alongside the optical flow cannel, which is suitable for stream processing where low latency is required. In addition, the modifications to the Coarse-to-fine PatchMatch, the binary descriptor, and the two scan-line pass per iteration implementation of the permeability filter permit filtering to be performed more efficiently in terms of computations and memory requirements than, e.g., using traditional SIFT features and the traditional Coarse-to-fine Patchmatch. Further, the foregoing optimizations are combined into an edge-aware spatio-temporal filtering pipeline that provides an efficient filtering implementation that experience has shown is significantly faster than traditional filter techniques. As a result, techniques disclosed herein may be used in real time to perform filtering in many image and video domain applications such as optical flow estimation, HDR tone mapping, stylization, detail manipulation, sparse data upsampling, disparity estimation, visual saliency computation, and temporal consistency, among others.

In the preceding description, reference is made to embodiments of the present disclosure. However the present disclosure is not limited to specific described embodiments. Instead, any combination of the preceding features and elements, whether related to different embodiments or not, is contemplated to implement and practice the present disclosure. Furthermore, although embodiments presented herein may achieve advantages over other possible solutions or over the prior art, whether or not a particular advantage is achieved by a given embodiment is not limiting. Thus, the preceding aspects, features, embodiments and advantages are merely illustrative and are not considered elements or limitations of the appended claims except where explicitly recited in a claim(s).

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "system."

Furthermore, aspects of the present disclosure may take the form of a computer program product embodied in one or more computer readable medium(s) having computer readable program code embodied thereon. Any combination of one or more tangible computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing.

Aspects of the present disclosure are described above with reference to flowchart illustrations or block diagrams of methods, apparatus (systems) and computer program products according to embodiments of the present disclosure. It will be understood that each block of the flowchart illustrations or block diagrams, and combinations of blocks in the flowchart illustrations or block diagrams, can be implemented by computer program instructions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for spatio-temporal video filtering, comprising:
    receiving an optical flow for a video frame in a video sequence;
    temporally filtering the optical flow using at least an edge-aware filter in time, wherein the edge-aware filter in time uses at least an optical flow from a previous time step to align a filter state from the previous time step to the video frame; and
    spatially and temporally filtering video frames, from one or more additional video channels, using at least the temporally filtered optical flow.

2. The computer-implemented method of claim 1, wherein the video frames from the one or more additional video channels are feature maps including one or more of disparity, saliency, or detail values.

3. The computer-implemented method of claim 1, further comprising estimating the received optical flow by:
    estimating a sparse optical flow for the video frame, wherein correspondences between the video frame and a previous frame are determined in the sparse optical flow estimation using at least a binary descriptor formulated as a collection of binarized octal orientation maps on spatial bins around a center of an associated region of the video frame; and
    spatially filtering the sparse optical flow using an edge-aware spatial filter.

4. The computer-implemented method of claim 3, wherein the video frame is divided into a plurality of partially overlapping tiles with overlapping bordering regions, wherein the spatial filtering is separately performed for each of the plurality of partially overlapping tiles, wherein the results of the separately performed spatial filtering are combined.

5. The computer-implemented method of claim 4, wherein separately performing the spatial filtering for each of the plurality of partially overlapping tiles includes:
    determining an approximation of a spatial edge-aware filtering output at a resolution lower than a full resolution;
    computing border conditions for the plurality of partially overlapping tiles using at least the approximation of the spatial edge-aware filtering output; and
    applying a permeability filter to the plurality of partially overlapping tiles.

6. The computer-implemented method of claim 3, wherein the binary descriptor is determined with integer arithmetic.

7. The computer-implemented method of claim 3, wherein the sparse optical flow is spatially filtered using at least one iteration of a permeability filter evaluated per iteration with two scan-line passes and a normalization map.

8. The computer-implemented method of claim 3, wherein the sparse optical flow is estimated with a modified Coarse-to-fine PatchMatch (CPM) technique using at least the binary descriptor, forward-back checks on coarsest and finest levels, and a quadratic interpolation.

9. The computer-implemented method of claim 1, wherein the temporal filtering is performed using at least a recursive permeability filter.

10. A non-transitory computer-readable medium storing a program, which, when executed by a processor performs operations for spatio-temporal video filtering, the operations comprising:
    receiving an optical flow for a video frame in a video sequence;
    temporally filtering the optical flow using at least an edge-aware filter in time, wherein the edge-aware filter in time uses at least an optical flow from a previous time step to align a filter state from the previous time step to the video frame; and
    spatially and temporally filtering video frames, from one or more additional video channels, using at least the temporally filtered optical flow.

11. The non-transitory computer-readable medium of claim 10, wherein the video frames from the one or more additional video channels are feature maps including one or more of disparity, saliency, or detail values.

12. The non-transitory computer-readable medium of claim 10, the operations further comprising, estimating the received optical flow by:
    estimating a sparse optical flow for the video frame, wherein correspondences between the video frame and a previous frame are determined in the sparse optical flow estimation using at least a binary descriptor formulated as a collection of binarized octal orientation maps on spatial bins around a center of an associated region of the video frame; and
    spatially filtering the sparse optical flow using an edge-aware spatial filter.

13. The non-transitory computer-readable medium of claim 12, wherein the video frame is divided into a plurality of partially overlapping tiles with overlapping bordering regions, wherein the spatial filtering is separately performed for each of the plurality of partially overlapping tiles, wherein the results of the separately performed spatial filtering are combined.

14. The non-transitory computer-readable medium of claim 13, wherein separately performing the spatial filtering for each of the plurality of partially overlapping tiles includes:
    determining an approximation of a spatial edge-aware filtering output at a resolution lower than a full resolution;
    computing border conditions for the plurality of partially overlapping tiles using at least the approximation of the spatial edge-aware filtering output; and
    applying a permeability filter to the plurality of partially overlapping tiles.

15. The non-transitory computer-readable medium of claim 12, wherein the binary descriptor is determined with integer arithmetic.

16. The non-transitory computer-readable medium of claim 12, wherein the sparse optical flow is spatially filtered using at least one iteration of a permeability filter evaluated per iteration with two scan-line passes and a normalization map.

17. The non-transitory computer-readable medium of claim 12, wherein the sparse optical flow is estimated with a modified Coarse-to-fine PatchMatch (CPM) technique using at least the binary descriptor, forward-back checks on coarsest and finest levels, and a quadratic interpolation.

18. A computer-implemented method of determining correspondences between a first image and a second image in a video sequence, comprising:
    determining, for each of a plurality of points in the first image and in the second image, binary descriptor values of a binary descriptor formulated as a collection of binarized octal orientation maps on spatial bins around a center of an associated region of the image; and
    comparing the determined binary descriptor values of points in the first image with the determined binary descriptor values of points in the second image to determine correspondences in estimating an optical flow for at least one of the first and second images, wherein images from one or more additional video channels are spatially and temporally filtered using at least the optical flow.

19. The computer-implemented method of claim 18, wherein the optical flow is spatially filtered using an edge-aware spatial filter and temporally filtered using at least an edge-aware filter in time, wherein the edge-aware filter in time uses at least an optical flow from a previous time step to align a filter state from the previous time step to the at least one image.

20. A computer-implemented method for spatio-temporal video filtering, comprising:
   estimating an optical flow for a video frame in a video sequence, wherein correspondences between the video frame and a previous frame are determined in the optical flow estimation using at least a binary descriptor formulated as a collection of binarized octal orientation maps on spatial bins around a center of an associated region of the video frame;
   spatially filtering the estimated optical flow using an edge-aware spatial filter; and
   temporally filtering the spatially filtered optical flow using at least an edge-aware filter in time, wherein the edge-aware filter in time uses at least an optical flow from a previous time step to align a filter state from the previous time step to the video frame.

* * * * *